US008884987B2

(12) United States Patent
Kitahara et al.

(10) Patent No.: US 8,884,987 B2
(45) Date of Patent: Nov. 11, 2014

(54) STORAGE MEDIUM HAVING STORED THEREON DISPLAY CONTROL PROGRAM, DISPLAY CONTROL APPARATUS, DISPLAY CONTROL SYSTEM, AND DISPLAY CONTROL METHOD FOR SETTING AND CONTROLLING DISPLAY OF A VIRTUAL OBJECT USING A REAL WORLD IMAGE

(75) Inventors: Shinji Kitahara, Kyoto (JP); Toshiaki Suzuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 469 days.

(21) Appl. No.: 13/174,834

(22) Filed: Jul. 1, 2011

(65) Prior Publication Data

US 2012/0068980 A1   Mar. 22, 2012

(30) Foreign Application Priority Data

Sep. 22, 2010 (JP) ................. 2010-211813

(51) Int. Cl.
G09G 5/00 (2006.01)
A63F 13/40 (2014.01)
G06T 19/00 (2011.01)

(52) U.S. Cl.
CPC ......... *A63F 13/10* (2013.01); *A63F 2300/6676* (2013.01); *A63F 2300/1093* (2013.01); *A63F 2300/69* (2013.01); *G06T 19/006* (2013.01); *A63F 2300/8076* (2013.01)
USPC ....................................... 345/633

(58) Field of Classification Search
USPC ................. 345/589–605, 629–642
See application file for complete search history.

(56) References Cited

U.S. PATENT DOCUMENTS

| 6,266,113 | B1 | 7/2001 | Yamazaki et al. |
| 7,747,074 | B2 | 6/2010 | Yamakado et al. |
| 2003/0062675 | A1 | 4/2003 | Noro et al. |
| 2004/0017579 | A1 | 1/2004 | Lim |
| 2004/0104935 | A1 | 6/2004 | Williamson et al. |
| 2006/0015497 | A1 | 1/2006 | Keating et al. |

(Continued)

FOREIGN PATENT DOCUMENTS

| JP | 09-097354 | 4/1997 |
| JP | 2002-247602 | 8/2002 |

(Continued)

OTHER PUBLICATIONS

Huynh et al. "Art of Defense: A Collaborative Handheld Augmented Reality Board Game" Proceeding of the 2009 ACM SIGGRAPH symposium on video games. ACM, 2009.*

(Continued)

*Primary Examiner* — Joseph Feild
*Assistant Examiner* — Gustavo Polo
(74) *Attorney, Agent, or Firm* — Nixon & Vanderhye, P.C.

(57) ABSTRACT

Captured image acquisition means acquires a captured image captured by a real camera. Color detection means, in the captured image acquired by the captured image acquisition means, detects at least one pixel having specific range color information in color information including at least one selected from the group including RGB values, a hue, a saturation, and a brightness. Image generation means, on the basis of the specific range color information of the at least one pixel detected by the color detection means, generates an image of an object to be placed in a virtual world. Image display control means displays the image generated by the image generation means on a display device.

12 Claims, 18 Drawing Sheets

(56) References Cited

U.S. PATENT DOCUMENTS

| | | |
|---|---|---|
| 2009/0102845 A1 | 4/2009 | Takemoto et al. |
| 2010/0007798 A1 | 1/2010 | Togawa |
| 2010/0027888 A1 | 2/2010 | Katano et al. |
| 2010/0160050 A1 | 6/2010 | Oku |
| 2010/0182340 A1 | 7/2010 | Bachelder et al. |
| 2012/0064971 A1 | 3/2012 | Devine et al. |
| 2012/0113140 A1 | 5/2012 | Hilliges et al. |

FOREIGN PATENT DOCUMENTS

| | | |
|---|---|---|
| JP | 2003-103045 | 4/2003 |
| JP | 2004-329629 | 11/2004 |
| JP | 2005-108137 | 4/2005 |
| JP | 2006-271657 | 10/2006 |
| JP | 2006-314446 | 11/2006 |
| JP | 2007-004714 | 1/2007 |
| JP | 2008-113746 | 5/2008 |
| JP | 2009-205522 | 9/2009 |
| JP | 2010-142592 | 7/2010 |
| JP | 2010-170316 | 8/2010 |

OTHER PUBLICATIONS

English language translation of JP 2008-113746, 31 pages.
Office Action in U.S. Appl. No. 13/185,581 dated Jan. 16, 2014.
Office Action in U.S. Appl. No. 13/197,231 dated Jan. 15, 2014.
Office Action in U.S. Appl. No. 13/197,231 dated May 31, 2013.
Office Action in U.S. Appl. No. 13/185,581 dated Jul. 1, 2014.

* cited by examiner

| BLOCK NUMBER | RGB AVERAGE VALUE | | | HUE H | SATURATION S | BRIGHTNESS V | SPECIFIC COLOR SETTING |
|---|---|---|---|---|---|---|---|
| | R | G | B | | | | |
| 1 | R1 | G1 | B1 | H1 | S1 | V1 | NO SPECIFIC COLOR |
| 2 | R2 | G2 | B2 | H2 | S2 | V2 | BLUE |
| 3 | R3 | G3 | B3 | H3 | S3 | V3 | BLUE |
| 4 | R4 | G4 | B4 | H4 | S4 | V4 | BLUE |
| ⋮ | ⋮ | ⋮ | ⋮ | ⋮ | ⋮ | ⋮ | ⋮ |
| Nmax | Rnmax | Gnmax | Bnmax | Hnmax | Snmax | Vnmax | NO SPECIFIC COLOR |

| SPECIFIC COLOR | TARGET OBJECT |
|---|---|
| RED | FLAME |
| GREEN | PLANTS AND FLOWERS |
| BLUE | WATER DROPLETS |
| ⋮ | ⋮ |

RENDERING WITH
PERSPECTIVE PROJECTION

STORAGE MEDIUM HAVING STORED THEREON DISPLAY CONTROL PROGRAM, DISPLAY CONTROL APPARATUS, DISPLAY CONTROL SYSTEM, AND DISPLAY CONTROL METHOD FOR SETTING AND CONTROLLING DISPLAY OF A VIRTUAL OBJECT USING A REAL WORLD IMAGE

CROSS REFERENCE TO RELATED APPLICATION

The disclosure of Japanese Patent Application No. 2010-211813, filed on Sep. 22, 2010, is incorporated herein by reference.

BACKGROUND OF THE INVENTION

1. Field of the Invention

The present invention relates to a storage medium having stored thereon a display control program, a display control apparatus, a display control system, and a display control method, and in particular, relates to a storage medium having stored thereon a display control program that sets and controls the display of a virtual object, using a real world image, and a display control apparatus, a display control system, and a display control method that set and control the display of a virtual object, using a real world image.

2. Description of the Background Art

Conventionally, as disclosed in, for example, Japanese Laid-Open Patent Publication No. 2008-113746 (hereinafter referred to as "Patent Literature 1"), a proposal is made for an apparatus that displays an image obtained by overlapping a real world image and a virtual world image. A game apparatus disclosed in Patent Literature 1 displays an image, captured by an outer camera, as a background image so as to overlap a game image. Specifically, the game apparatus updates the background image at regular time intervals, and displays the most recent background image so as to overlap the game image.

The game apparatus disclosed in Patent Literature 1, however, merely displays the image captured by the outer camera as the background image. In this case, the overlapping background image and game image are displayed in the state where they are not related to each other at all. Thus, the displayed image per se is monotonous, and therefore, it is not possible to present an interesting image to a user.

SUMMARY OF THE INVENTION

Therefore, it is an object of the present invention to provide a storage medium having stored thereon a display control program capable of setting and controlling the display of a new image, using a real world image, and a display control apparatus, a display control system, and a display control method that are capable of setting and controlling the display of a new image, using a real world image.

To achieve the above object, the present invention may employ, for example, the following configurations. It is understood that when the description of the scope of the appended claims is interpreted, the scope should be interpreted only by the description of the scope of the appended claims. If the description of the scope of the appended claims contradicts the description of these columns, the description of the scope of the appended claims has priority.

An example of the configuration of a computer-readable storage medium having stored thereon a display control program according to the present invention is executed by a computer of a display control apparatus that displays an image on a display device. The display control program causes the computer to function as captured image acquisition means, color detection means, image generation means, and image display control means. The captured image acquisition means acquires a captured image captured by a real camera. The color detection means, in the captured image acquired by the captured image acquisition means, detects at least one pixel having specific range color information in color information including at least one selected from the group including RGB values, a hue, a saturation, and a brightness. The image generation means, on the basis of the specific range color information of the at least one pixel detected by the color detection means, generates an image of an object to be placed in a virtual world. The image display control means displays the image generated by the image generation means on the display device.

Based on the above, a pixel having specific range color information is detected from a captured image captured by a real camera, and an object corresponding to the specific range color information is generated and displayed. This makes it possible to set and control the display of a new image, using a real world image.

In addition, the image generation means may generate a combined image obtained by combining the captured image acquired by the captured image acquisition means with a virtual world image in which the object placed in the virtual world is viewed from a virtual camera. The image display control means may display the combined image generated by the image generation means on the display device.

Based on the above, display is performed such that the captured image (the real world image) and an image of the object (a virtual world image) are combined together. This makes it possible to present a more interesting image.

In addition, the image generation means may generate an image of the virtual world, in which the object is viewed from the virtual camera, as the virtual world image by placing the object in the virtual world such that, in accordance with a detection position where the at least one pixel having the specific range color information has been detected in the captured image by the color detection means, the image of the object in the virtual world image is combined with the captured image so as to overlap the detection position.

Based on the above, the object is placed in a virtual space so as to correspond to the position of the pixel having the specific range color information detected from the captured image. This makes it possible to make representation as if the object is placed on the pixel in the captured image.

In addition, the image generation means may include virtual camera setting means. The virtual camera setting means, on the basis of an output from detection means for detecting a motion of the real camera, detects the motion of the real camera, and sets a position and a capturing direction of the virtual camera by imparting the same motion as the motion of the real camera to the virtual camera. In this case, after generating the virtual world image in which the object is placed in the virtual world, the image generation means may generate, as the virtual world image, an image of the virtual world, in which the object is viewed from the virtual camera set by the virtual camera setting means.

Based on the above, the same motion as the motion of the real camera is imparted to a virtual camera. This makes it possible that even when the capturing range of the real camera has changed, the object is placed at the same position in the captured image after the change in the capturing range. It is possible to display the object as if placed in a real space represented by the captured image.

In addition, the color detection means may include region detection means and area calculation means. The region detection means, in the captured image acquired by the captured image acquisition means, detects a region of the at least one pixel having the specific range color information. The area calculation means calculates an area determined in accordance with the region detected by the region detection means, The image generation means may generate the image of the object by setting a size of the object in accordance with the area calculated by the area calculation means.

Based on the above, the size of the object is determined in accordance with the area of a group of pixels having the specific range color information detected from the captured image, and therefore, the object to be placed changes with not only its color but also its area taken into account. This makes it possible to present a more interesting image.

In addition, the image generation means may include object setting means. The object setting means sets in advance a plurality of objects for specific ranges of the color information, respectively. The image generation means may place in the virtual world, among the plurality of objects, the object corresponding to the specific range color information of the at least one pixel detected by the color detection means, and thereby generate an image of the placed object.

Based on the above, a plurality of objects are set in advance for specific ranges of color information, respectively, and an object to be placed in a virtual world is selected from among the plurality of objects in accordance with the specific range color information of the pixel detected by the captured image. This makes it possible to set various objects depending on colors as objects to be displayed, and therefore present a more interesting image.

In addition, the display control program may further cause the computer to function as operation input data acquisition means, operation object placement means, and point addition means. The operation input data acquisition means acquires data indicating an operation input provided by a user. The operation object placement means, when the data acquired by the operation input data acquisition means indicates a predetermined operation input, places an operation object in the virtual world, the operation object being different from the object. The point addition means adds a predetermined point when a predetermined positional relationship has been obtained between the object and the operation object in the virtual world. The image generation means may generate the image of the object and an image of the operation object by placing also the operation object in the virtual world.

Based on the above, for example, a projectile object representing a bullet or the like is placed in a virtual world in accordance with an operation of a user, and a predetermined point is scored on the basis of the positional relationship between the objects. This makes it possible to display the images of the objects while preventing the user from becoming bored.

In addition, the display control program may further cause the computer to function as moving object placement means. The moving object placement means places a moving object in the virtual world, aside from the operation object, the moving object moving in accordance with a predetermined algorithm. In this case, the point addition means may further add a predetermined point when a predetermined positional relationship has been obtained between the moving object and the operation object. The image generation means may generate the image of the object, the image of the operation object, and an image of the moving object by placing also the moving object in the virtual world.

Based on the above, the user can enjoy scoring points by providing an operation object with a predetermined positional relationship with a moving object, and further enjoy scoring more points by moving the real camera to cause an object other than the moving object to appear on the basis of the color information, and providing the operation object with a predetermined positional relationship with the object. For example, the simultaneous progression of the game where the moving object placed in the virtual world is defeated; and the game where the object is caused to appear in the same virtual world by capturing a specific color as a subject, and serves as a scoring target, can enhance the user's interest.

In addition, when the at least one pixel having the specific range color information detected by the color detection means covers a predetermined region or more, the image generation means may place in the virtual world an object corresponding to the specific range color information, and thereby generate an image of the placed object.

Based on the above, to display the object, the pixel having the specific range color information needs to be detected so as to cover a predetermined region or more. Thus, the user needs to perform a capturing operation of selecting a subject from which the object is to be displayed, in order to display the object, and adjusting the capturing range. This requires the user a new operation for displaying a new image.

In addition, the color detection means may detect at least one pixel having items of the color information indicating the saturation and the brightness that are equal to or greater than predetermined thresholds, respectively, and also having an item of the color information indicating the hue indicative of a value within a predetermined range.

Based on the above, the detection of a color by combining a plurality of items of the color information makes it possible to bring the color detection result close to the color recognition normally performed by the user, while preventing erroneous color determinations.

In addition, the color detection means may include block division means, hue calculation means, block classification means, and block group selection means. The block division means divides the captured image into blocks each including a plurality of pixels. The hue calculation means, on the basis of RGB values of each pixel included in the blocks, calculates values indicating hues of the respective blocks. The block classification means, on the basis of predetermined hue ranges including the values indicating the hues of the blocks, sets hue categories to which the blocks belong, respectively. The block group selection means, in accordance with a size of a group of adjacent blocks belonging to the same hue category, selects a group of blocks from which the image of the object is to be generated. In accordance with the hue category of the group of blocks selected by the block group selection means, the image generation means may select an object to be placed in the virtual world.

Based on the above, the determination of a hue on a block-by-block basis facilitates a color detection process, and therefore reduces the processing load.

In addition, the captured image acquisition means may repeatedly acquire captured images of a real world captured in real time by a real camera available to the display control apparatus. The color detection means may detect the at least one pixel having the specific range color information in each of the captured images repeatedly acquired by the captured image acquisition means. The image generation means may repeatedly generate the combined image by combining each of the captured images repeatedly acquired by the captured image acquisition means, with the virtual world image generated on the basis of the captured image. The image display control means may repeatedly display on the display device the combined images obtained by combining the captured images repeatedly acquired by the captured image acquisition means, with the respective virtual world images.

Based on the above, the pixel having the specific range color information is detected from the captured image of the real world captured in real time, and display is performed such that an object corresponding to the color information is combined with the image captured in real time. This makes it possible to set and control the display of a new image, using a real world image obtained in real time.

In addition, the present invention may be carried out in the form of a display control apparatus and a display control system that include the above means, and may be carried out in the form of a display control method including operations performed by the above means.

Based on the present invention, a pixel having specific range color information is detected from a captured image captured by a real camera, and an object corresponding to the specific range color information is generated and displayed. This makes it possible to set and control the display of a new image, using a real world image.

These and other objects, features, aspects and advantages of the present invention will become more apparent from the following detailed description of the present invention when taken in conjunction with the accompanying drawings.

BRIEF DESCRIPTION OF THE DRAWINGS

FIG. 613 is a diagram showing an example where display is performed on the upper LCD 22 such that a target object OBJ1 has appeared from the blue subject included in the camera image CI;

FIG. 10 is a diagram showing an example of specific color determination result data Dd of FIG. 9;

FIG. 11 is a diagram showing an example of target object setting data De1 of FIG. 9;

DESCRIPTION OF THE PREFERRED EMBODIMENTS

Figure 1:
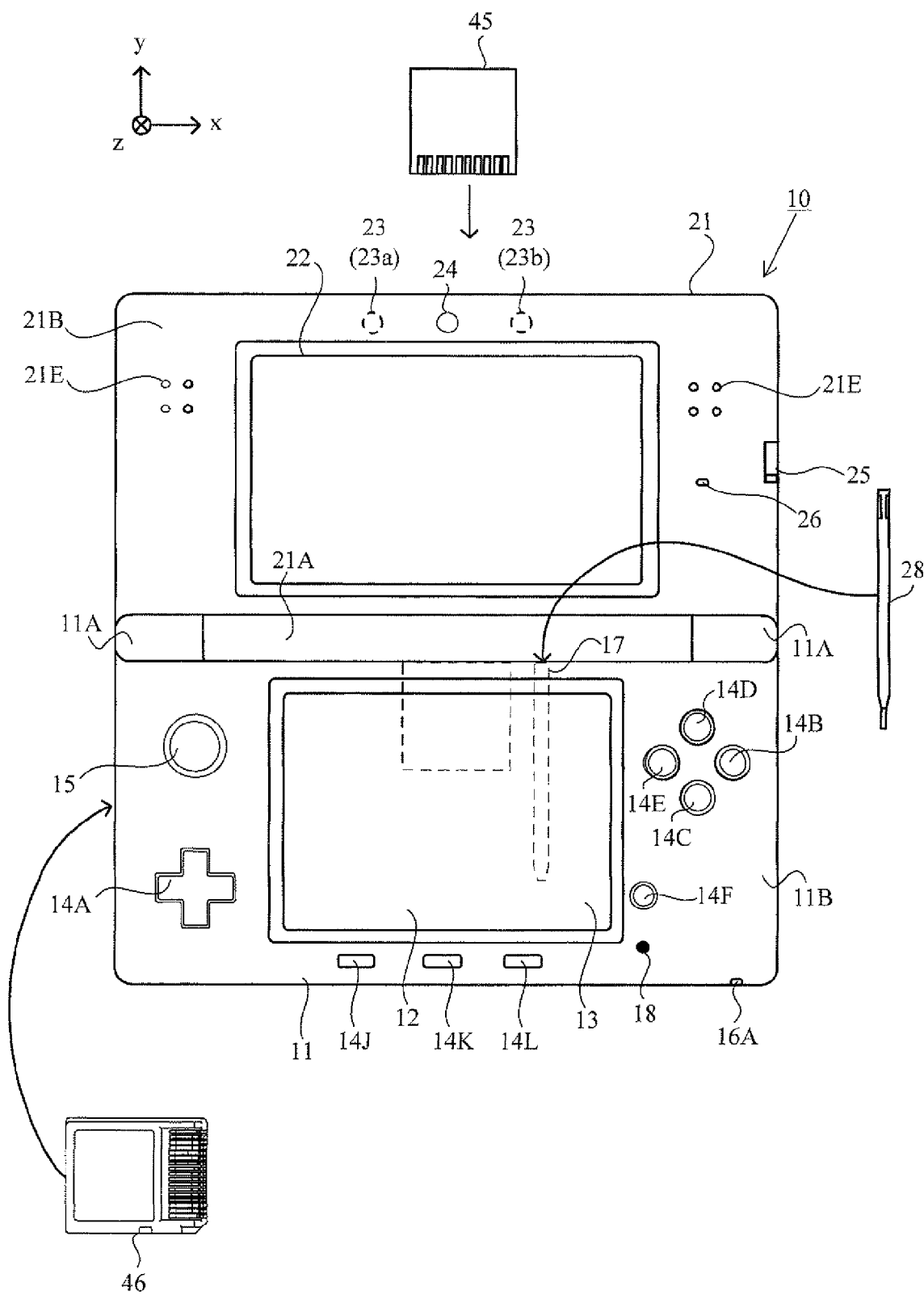
FIG. 1 is a front view showing an example of a game apparatus 10 being open.
Figure 2:
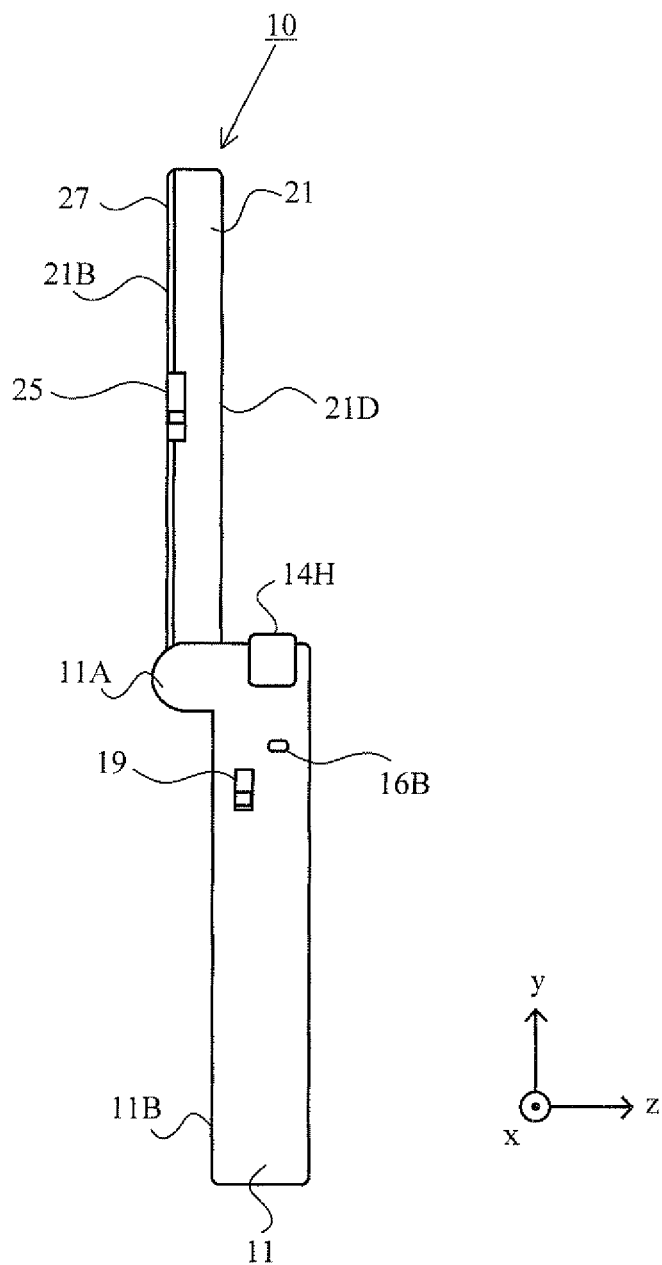
FIG. 2 is a right side view showing an example of the game apparatus 10 being open.
Figure 3:
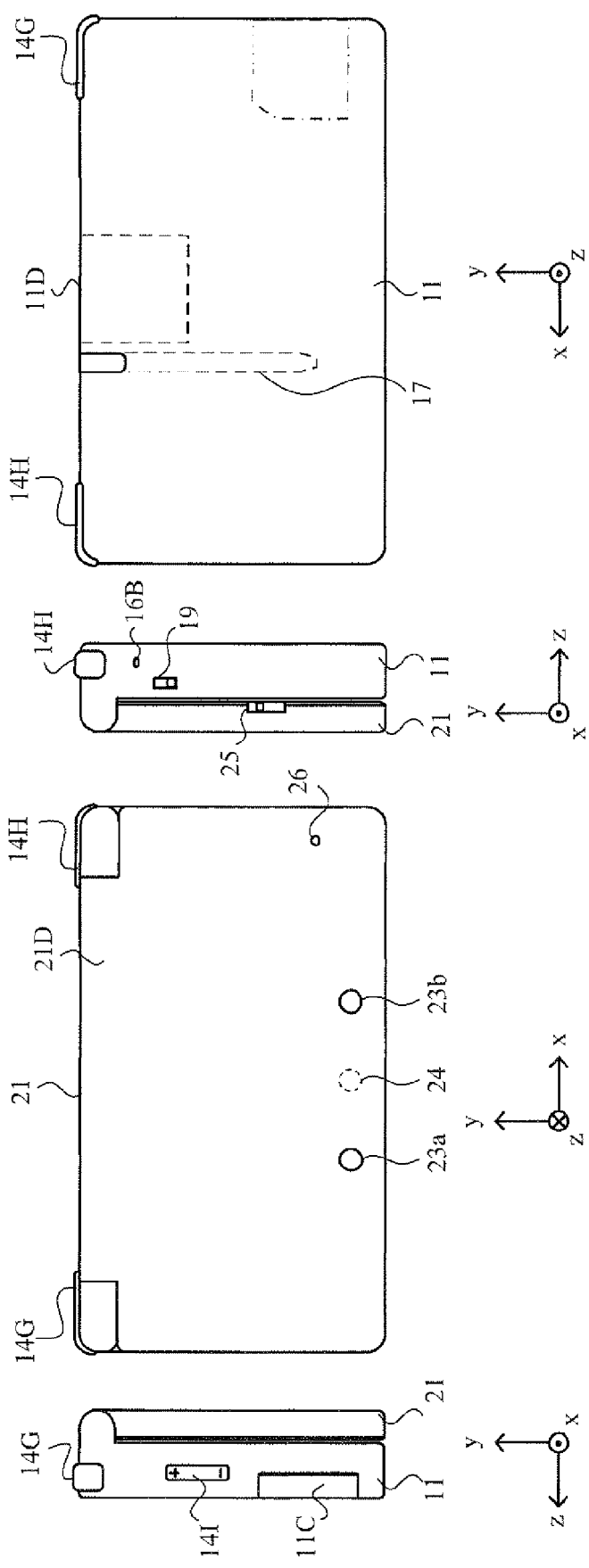
FIG. 3A is a left side view showing an example of the game apparatus 10 being closed.
FIG. 3B is a front view showing an example of the game apparatus 10 being closed.
FIG. 3C is a right side view showing an example of the game apparatus 10 being closed.
FIG. 3D is a rear view showing an example of the game apparatus 10 being closed.

With reference to the drawings, a description is given of an image control apparatus that executes an image control program according to an embodiment of the present invention. The image control program according to the present invention can be applied by being executed by a given computer system. As an example of the image control apparatus, a hand-held game apparatus 10 is taken, and the description is given using the image control program executed by the game apparatus 10. It should be noted that FIGS. 1 through 3D are each a plan view showing an example of the outer appearance of the game apparatus 10. As an example, the game apparatus 10 is a hand-held game apparatus, and is configured to be foldable as shown in FIGS. 1 through 3D. FIG. 1 is a front view showing an example of the game apparatus 10 being open (in an open state). FIG. 2 is a right side view showing an example of the game apparatus 10 in the open state. FIG. 3A is a left side view showing an example of the game apparatus 10 being closed (in a closed state). FIG. 3B is a front view showing an example of the game apparatus 10 in the closed state. FIG. 3C is a right side view showing an example of the game apparatus 10 in the closed state. FIG. 3D is a rear view showing an example of the game apparatus 10 in the closed state. The game apparatus 10 includes capturing sections, and is capable, for example, of capturing an image with the capturing sections, displaying the captured image on a screen, and storing data of the captured image. The game apparatus 10 is capable of executing a game program stored in an exchangeable memory card, or received from a server or another game apparatus, and is also capable of displaying on the screen an image generated by computer graphics processing, such as a virtual space image viewed from a virtual camera set in a virtual space.

In FIGS. 1 through 3D, the game apparatus 10 includes a lower housing 11 and an upper housing 21. The lower housing 11 and the upper housing 21 are joined together so as to be openable and closable in a folding manner (foldable). In the example of FIG. 1, the lower housing 11 and the upper housing 21 each have a wider-than-high rectangular plate-like shape, and are joined together at one of the long sides of the lower housing 11 and the corresponding one of the long sides of the upper housing 21 so as to be pivotable relative to each other. Normally, a user uses the game apparatus 10 in the open state. The user stores away the game apparatus 10 in the closed state when not using it. Further, as well as the closed state and the open state that are described above, the game apparatus 10 can maintain the lower housing 11 and the upper housing 21 at a given angle formed between the game apparatus 10 in the closed state and the game apparatus 10 in the open state due, for example, to a frictional force generated at the connecting part. That is, the upper housing 21 can be maintained stationary at a given angle with respect to the lower housing 11.

As shown in FIGS. 1 and 2, projections 11A are provided at the upper long side portion of the lower housing 11, the projections 11A projecting perpendicularly to an inner surface (main surface) 11B of the lower housing 11. A projection 21A is provided at the lower long side portion of the upper housing 21, the projection 21A projecting perpendicularly to the lower side surface of the upper housing 21 from the lower side surface of the upper housing 21. The joining of the projections 11A of the lower housing 11 and the projection 21A of the upper housing 21 connects the lower housing 11 and the upper housing 21 together in a foldable manner.

The lower housing 11 includes a lower liquid crystal display (LCD) 12, a touch panel 13, operation buttons 14A through 14L (FIG. 1, FIGS. 3A through 3D), an analog stick 15, LEDs 16A and 16B, an insertion slot 17, and a microphone hole 18. These components are described in detail below.

As shown in FIG. 1, the lower LCD 12 is accommodated in the lower housing 11. The lower LCD 12 has a wider-than-high shape, and is placed such that the long side direction of the lower LCD 12 coincides with the long side direction of the lower housing 11. The lower LCD 12 is placed at the center of the lower housing 11. The lower LCD 12 is provided on the inner surface (main surface) of the lower housing 11, and the screen of the lower LCD 12 is exposed through an opening provided in the inner surface of the lower housing 11. The game apparatus 10 is in the closed state when not used, so that the screen of the lower LCD 12 is prevented from being soiled or damaged. As an example, the number of pixels of the lower LCD 12 is 256 dots×192 dots (horizontal×vertical). Unlike the upper LCD 22 described later, the lower LCD 12 is a display device that displays an image in a planar manner (not in a stereoscopically visible manner). It should be noted that although an LCD is used as a display device in the present embodiment, another given display device may be used, such as a display device using electroluminescence (EL). Further, a display device having a given resolution may be used as the lower LCD 12.

As shown in FIG. 1, the game apparatus 10 includes the touch panel 13 as an input device. The touch panel 13 is mounted so as to cover the screen of the lower LCD 12. In the present embodiment, the touch panel 13 may be, but is not limited to, a resistive touch panel. The touch panel may also be a touch panel of any pressure type, such as an electrostatic capacitance type. In the present embodiment, the touch panel 13 has the same resolution (detection accuracy) as that of the lower LCD 12. The resolutions of the touch panel 13 and the lower LCD 12, however, may not necessarily need to coincide with each other. Further, the insertion slot 17 (a dashed line shown in FIGS. 1 and 3D) is provided on the upper side surface of the lower housing 11. The insertion slot 17 can accommodate a stylus 28 that is used to perform an operation on the touch panel 13. Although an input on the touch panel 13 is normally provided using the stylus 28, an input may be provided on the touch panel 13 not only by the stylus 28 but also by a finger of the user.

The operation buttons 14A through 14L are each an input device for providing a predetermined input. As shown in FIG. 1, among the operation buttons 14A through 14L, the cross button 14A (direction input button 14A), the button 14B, the button 14C, the button 14D, the button 14E, the power button 14F, the select button 143, the home button 14K, and the start button 14L are provided on the inner surface (main surface) of the lower housing 11. The cross button 14A is cross-shaped, and includes buttons for indicating up, down, left, and right directions, respectively. The button 14B, the button 14C, the button 14D, and the button 14E are placed in a cross formation. The buttons 14A through 14E, the select button 14J, the home button 14K, and the start button 14L are appropriately assigned functions, respectively, in accordance with the program executed by the game apparatus 10. The cross button 14A is used for, for example, a selection operation, The operation buttons 14B through 14E are used for, for example, a determination operation or a cancellation operation. The power button 14F is used to power on/off the game apparatus 10.

The analog stick 15 is a device for indicating a direction, and is provided in the upper left region of the lower LCD 12 of the inner surface of the lower housing 11. As shown in FIG. 1, the cross button 14A is provided in the lower left region of the lower LCD 12 of the lower housing 11 such that the analog stick 15 is provided above the cross button 14A. The analog stick 15 and the cross button 14A are placed so as to be operated by the thumb of a left hand holding the lower housing 11. Further, the provision of the analog stick 15 in the upper region places the analog stick 15 at the position where the thumb of a left hand holding the lower housing 11 is naturally placed, and also places the cross button 14A at the position where the thumb of the left hand is moved slightly downward from the analog stick 15. The key top of the analog stick 15 is configured to slide parallel to the inner surface of the lower housing 11. The analog stick 15 functions in accordance with the program executed by the game apparatus 10. When, for example, the game apparatus 10 executes a game where a predetermined object appears in a three-dimensional virtual space, the analog stick 15 functions as an input device for moving the predetermined object in the three-dimensional virtual space. In this case, the predetermined object is moved in the direction in which the key top of the analog stick 15 has slid. It should be noted that the analog stick 15 may be a component capable of providing an analog input by being tilted by a predetermined amount in any one of up, down, right, left, and diagonal directions.

The four buttons placed in a cross formation, namely, the button 14B, the button 14C, the button 14D, and the button 14E, are placed at the positions where the thumb of a right hand holding the lower housing 11 is naturally placed. Further, these four buttons and the analog stick 15 are placed symmetrically to each other with respect to the lower LCD 12.

This also enables, for example, a left-handed person to provide a direction indication input using these four buttons, depending on the game program.

Further, the microphone hole 18 is provided on the inner surface of the lower housing 11. Underneath the microphone hole 18, a microphone (see FIG. 5) is provided as the sound input device described later, and detects sound from outside the game apparatus 10.

As shown in FIGS. 3B and 3D, the L button 14G and the R button 14H are provided on the upper side surface of the lower housing 11. The L button 14G is provided at the left end portion of the upper side surface of the lower housing 11, and the R button 14H is provided at the right end portion of the upper side surface of the lower housing 11. As described later, the L button 14G and the R button 14H function as shutter buttons (capturing instruction buttons) of the capturing sections. Further, as shown in FIG. 3A, the sound volume button 14I is provided on the left side surface of the lower housing 11. The sound volume button 14I is used to adjust the sound volume of a loudspeaker of the game apparatus 10.

As shown in FIG. 3A, a cover section 11C is provided on the left side surface of the lower housing 11 so as to be openable and closable. Within the cover section 11C, a connector (not shown) is provided for electrically connecting the game apparatus 10 and a data storage external memory 46 together. The data storage external memory 46 is detachably attached to the connector. The data storage external memory 46 is used to, for example, record (store) data of an image captured by the game apparatus 10. It should be noted that the connector and the cover section 11C may be provided on the right side surface of the lower housing 11.

As shown in FIG. 3D, on the upper side surface of the lower housing 11, an insertion slot 11D is provided, into which an external memory 45 having a game program stored thereon is to be inserted. Within the insertion slot 11D, a connector (not shown) is provided for electrically connecting the game apparatus 10 and the external memory 45 together in a detachable manner. A predetermined game program is executed by connecting the external memory 45 to the game apparatus 10. It should be noted that the connector and the insertion slot 11D may be provided on another side surface (e.g., the right side surface) of the lower housing 11.

As shown in FIG. 1, on the lower side surface of the lower housing 11, the first LED 16A is provided for notifying the user of the on/off state of the power supply of the game apparatus 10. Further, as shown in FIG. 3C, on the right side surface of the lower housing 11, the second LED 16B is provided for notifying the user of the establishment state of the wireless communication of the game apparatus 10. Furthermore, the game apparatus 10 is capable of wirelessly communicating with other devices, and the second LED 16B is lit on when wireless communication is established between the game apparatus 10 and other devices. The game apparatus 10 has the function of establishing connection with a wireless LAN by, for example, a method based on the IEEE 802.11.b/g standard. On the right side surface of the lower housing 11, a wireless switch 19 is provided for enabling/disabling the function of the wireless communication (see FIG. 3C).

It should be noted that although not shown in the figures, a rechargeable battery that serves as the power supply of the game apparatus 10 is accommodated in the lower housing 11, and the battery can be charged through a terminal provided on the side surface (e.g., the upper side surface) of the lower housing 11.

The upper housing 21 includes an upper LCD 22, an outer capturing section 23 having two outer capturing sections (a left outer capturing section 23a and a right outer capturing section 23b), an inner capturing section 24, a 3D adjustment switch 25, and a 3D indicator 26. These components are described in detail below.

As shown in FIG. 1, the upper LCD 22 is accommodated in the upper housing 21. The upper LCD 22 has a wider-than-high shape, and is placed such that the long side direction of the upper LCD 22 coincides with the long side direction of the upper housing 21. The upper LCD 22 is placed at the center of the upper housing 21. As an example, the area of the screen of the upper LCD 22 is set greater than that of the lower LCD 12. Specifically, the screen of the upper LCD 22 is set horizontally longer than the screen of the lower LCD 12. That is, the proportion of the width in the aspect ratio of the screen of the upper LCD 22 is set greater than that of the lower LCD 12.

The screen of the upper LCD 22 is provided on the inner surface (main surface) 21B of the upper housing 21, and is exposed through an opening provided in the inner surface of the upper housing 21. Further, as shown in FIG. 2, the inner surface of the upper housing 21 is covered by a transparent screen cover 27. The screen cover 27 protects the screen of the upper LCD 22, and integrates the upper LCD 22 and the inner surface of the upper housing 21, and thereby provides unity. As an example, the number of pixels of the upper LCD 22 is 640 dots×200 dots (horizontal×vertical). It should be noted that although an LCD is used as the upper LCD 22 in the present embodiment, a display device using EL or the like may be used. Furthermore, a display device having a given resolution may be used as the upper LCD 22.

The upper LCD 22 is a display device capable of displaying a stereoscopically visible image. The upper LCD 22 is capable of displaying a left-eye image and a right-eye image, using substantially the same display region. Specifically, the upper LCD 22 is a display device using a method in which the left-eye image and the right-eye image are displayed alternately in the horizontal direction in predetermined units (e.g., in every other line). It should be noted that the upper LCD 22 may be a display device using a method in which the left-eye image and the right-eye image are displayed alternately for a predetermined time. Further, the upper LCD 22 is a display device capable of displaying an image stereoscopically visible with the naked eye. In this case, a lenticular type display device or a parallax barrier type display device is used so that the left-eye image and the right-eye image that are displayed alternately in the horizontal direction can be viewed separately with the left eye and the right eye, respectively. In the present embodiment, the upper LCD 22 is of a parallax barrier type. The upper LCD 22 displays an image stereoscopically visible with the naked eye (a stereoscopic image), using the right-eye image and the left-eye image. That is, the upper LCD 22 allows the user to view the left-eye image with their left eye, and the right-eye image with their right eye, using the parallax barrier. This makes it possible to display a stereoscopic image giving the user a stereoscopic effect (a stereoscopically visible image). Furthermore, the upper LCD 22 is capable of disabling the parallax barrier. When disabling the parallax barrier, the upper LCD 22 is capable of displaying an image in a planar manner (the upper LCD 22 is capable of displaying a planar view image, as opposed to the stereoscopically visible image described above. This is a display mode in which the same displayed image can be viewed with both the left and right eyes.). Thus, the upper LCD 22 is a display device capable of switching between: the stereoscopic display mode for displaying a stereoscopically visible image; and the planar display mode for displaying an image in a planar manner (displaying a planar view image). The switching of the display modes is performed by the 3D adjustment switch 25 described later.

The "outer capturing section 23" is the collective term of the two capturing sections (the left outer capturing section 23a and the right outer capturing section 23b) provided on an outer surface (the back surface, which is the opposite side to the main surface including the upper LCD 22) 21D of the upper housing 21. The capturing directions of the left outer capturing section 23a and the right outer capturing section 23b are each the same as the outward normal direction of the outer surface 21D. Further, the left outer capturing section 23a and the right outer capturing section 23b are each designed so as to be placed 180 degrees opposite to the normal direction of the display surface (inner surface) of the upper LCD 22. That is, the capturing direction of the left outer capturing section 23a and the capturing direction of the right outer capturing section 23b are parallel to each other. The left outer capturing section 23a and the right outer capturing section 23b can be used as a stereo camera, depending on the program executed by the game apparatus 10. Alternatively, either one of the two outer capturing sections (the left outer capturing section 23a and the right outer capturing section 23b) may be used solely, so that the outer capturing section 23 can also be used as a non-stereo camera, depending on the program. Yet alternatively, depending on the program, images captured by the two outer capturing sections (the left outer capturing section 23a and the right outer capturing section 23b) may be combined together, or may be used to compensate for each other, so that capturing can be performed with an extended capturing range. In the present embodiment, the outer capturing section 23 includes two capturing sections, namely, the left outer capturing section 23a and the right outer capturing section 23b. The left outer capturing section 23a and the right outer capturing section 23b each include an imaging device (e.g., a CCD image sensor or a CMOS image sensor) having a predetermined common resolution, and a lens. The lens may have a zoom mechanism.

As indicated by dashed lines in FIG. 1 and solid lines in FIG. 3B, the left outer capturing section 23a and the right outer capturing section 23b included in the outer capturing section 23 are placed parallel to the horizontal direction of the screen of the upper LCD 22. That is, the left outer capturing section 23a and the right outer capturing section 23b are placed such that a straight line connecting between the left outer capturing section 23a and the right outer capturing section 23b is parallel to the horizontal direction of the screen of the upper LCD 22. The dashed lines 23a and 23b in FIG. 1 indicate the left outer capturing section 23a and the right outer capturing section 23b, respectively, provided on the outer surface, which is the opposite side of the inner surface of the upper housing 21. As shown in FIG. 1, when the user views the screen of the upper LCD 22 from the front thereof, the left outer capturing section 23a is placed to the left of the upper LCD 22, and the right outer capturing section 23b is placed to the right of the upper LCD 22. When a program is executed that causes the outer capturing section 23 to function as a stereo camera, the left outer capturing section 23a captures a left-eye image, which is to be viewed with the user's left eye, and the right outer capturing section 23b captures a right-eye image, which is to be viewed with the user's right eye. The distance between the left outer capturing section 23a and the right outer capturing section 23b is set to correspond to the distance between both eyes of a person, and may be set, for example, in the range of from 30 mm to 70 mm. The distance between the left outer capturing section 23a and the right outer capturing section 23b, however, is not limited to this range.

It should be noted that in the present embodiment, the left outer capturing section 23a and the right outer capturing section 23b are fixed to the housing, and therefore, the capturing directions cannot be changed.

The left outer capturing section 23a and the right outer capturing section 23b are placed symmetrically to each other with respect to the center of the upper LCD 22 (the upper housing 21) in the left-right direction. That is, the left outer capturing section 23a and the right outer capturing section 23b are placed symmetrically with respect to the line dividing the upper LCD 22 into two equal left and right parts. Further, the left outer capturing section 23a and the right outer capturing section 23b are placed in the upper portion of the upper housing 21 and in the back of the portion above the upper end of the screen of the upper LCD 22, in the state where the upper housing 21 is in the open state. That is, the left outer capturing section 23a and the right outer capturing section 23b are placed on the outer surface of the upper housing 21, and, if the upper LCD 22 is projected onto the outer surface of the upper housing 21, is placed above the upper end of the screen of the projected upper LCD 22.

Thus, the two capturing sections (the left outer capturing section 23a and the right outer capturing section 23b) of the outer capturing section 23 are placed symmetrically with respect to the center of the upper LCD 22 in the left-right direction. This makes it possible that when the user views the upper LCD 22 from the front thereof, the capturing directions of the outer capturing section 23 coincide with the directions of the respective lines of sight of the user's right and left eyes. Further, the outer capturing section 23 is placed in the back of the portion above the upper end of the screen of the upper LCD 22, and therefore, the outer capturing section 23 and the upper LCD 22 do not interfere with each other inside the upper housing 21. This makes it possible to reduce the upper housing 21 in thickness as compared to the case where the outer capturing section 23 is placed in the back of the screen of the upper LCD 22.

The inner capturing section 24 is provided on the inner surface (main surface) 21B of the upper housing 21, and functions as a capturing section having a capturing direction that is the same as the inward normal direction of the inner surface 21B of the upper housing 21. The inner capturing section 24 includes an imaging device (e.g., a CCD image sensor or a CMOS image sensor) having a predetermined resolution, and a lens. The lens may have a zoom mechanism.

As shown in FIG. 1, when the upper housing 21 is in the open state, the inner capturing section 24 is placed: in the upper portion of the upper housing 21; above the upper end of the screen of the upper LCD 22; and in the center of the upper housing 21 in the left-right direction (on the line dividing the upper housing 21 (the screen of the upper LCD 22) into two equal left and right parts). Specifically, as shown in FIGS. 1 and 3B, the inner capturing section 24 is placed on the inner surface of the upper housing 21 and in the back of the middle portion between the left outer capturing section 23a and the right outer capturing section 23b. That is, if the left outer capturing section 23a and the right outer capturing section 23b provided on the outer surface of the upper housing 21 are projected onto the inner surface of the upper housing 21, the inner capturing section 24 is placed at the middle portion between the projected left outer capturing section 23a and the projected right outer capturing section 23b. The dashed line 24 shown in FIG. 3B indicates the inner capturing section 24 provided on the inner surface of the upper housing 21.

Thus, the inner capturing section 24 captures an image in the direction opposite to that of the outer capturing section 23. The inner capturing section 24 is provided on the inner surface of the upper housing 21 and in the back of the middle portion between the two capturing sections of the outer capturing section 23. This makes it possible that when the user views the upper LCD 22 from the front thereof, the inner capturing section 24 captures the user's face from the front thereof. Further, the left outer capturing section 23a and the right outer capturing section 23b do not interfere with the inner capturing section 24 inside the upper housing 21. This makes it possible to reduce the upper housing 21 in thickness.

The 3D adjustment switch 25 is a slide switch, and is used to switch the display modes of the upper LCD 22 as described above. The 3D adjustment switch 25 is also used to adjust the stereoscopic effect of a stereoscopically visible image (stereoscopic image) displayed on the upper LCD 22. As shown in FIGS. 1 through 3D, the 3D adjustment switch 25 is provided at the end portion shared by the inner surface and the right side surface of the upper housing 21, and is placed so as to be visible to the user when the user views the upper LCD 22 from the front thereof. The 3D adjustment switch 25 includes a slider that is slidable to a given position in a predetermined direction (e.g., the up-down direction), and the display mode of the upper LCD 22 is set in accordance with the position of the slider.

When, for example, the slider of the 3D adjustment switch 25 is placed at the lowermost position, the upper LCD 22 is set to the planar display mode, and a planar image is displayed on the screen of the upper LCD 22. It should be noted that the same image may be used as the left-eye image and the right-eye image, while the upper LCD 22 remains in the stereoscopic display mode, and thereby performs planar display. On the other hand, when the slider is placed above the lowermost position, the upper LCD 22 is set to the stereoscopic display mode. In this case, a stereoscopically visible image is displayed on the screen of the upper LCD 22. When the slider is placed above the lowermost position, the visibility of the stereoscopic image is adjusted in accordance with the position of the slider. Specifically, the amount of deviation in the horizontal direction between the position of the right-eye image and the position of the left-eye image is adjusted in accordance with the position of the slider.

The 3D indicator 26 indicates whether or not the upper LCD 22 is in the stereoscopic display mode. For example, the 3D indicator 26 is an LED, and is lit on when the stereoscopic display mode of the upper LCD 22 is enabled. As shown in FIG. 1, the 3D indicator 26 is placed on the inner surface of the upper housing 21 near the screen of the upper LCD 22. Accordingly, when the user views the screen of the upper LCD 22 from the front thereof, the user can easily view the 3D indicator 26. This enables the user to easily recognize the display mode of the upper LCD 22 even while viewing the screen of the upper LCD 22.

In addition, speaker holes 21E are provided on the inner surface of the upper housing 21. Sound from the loudspeaker 44 descried later is output through the speaker holes 21E.

Figure 4:
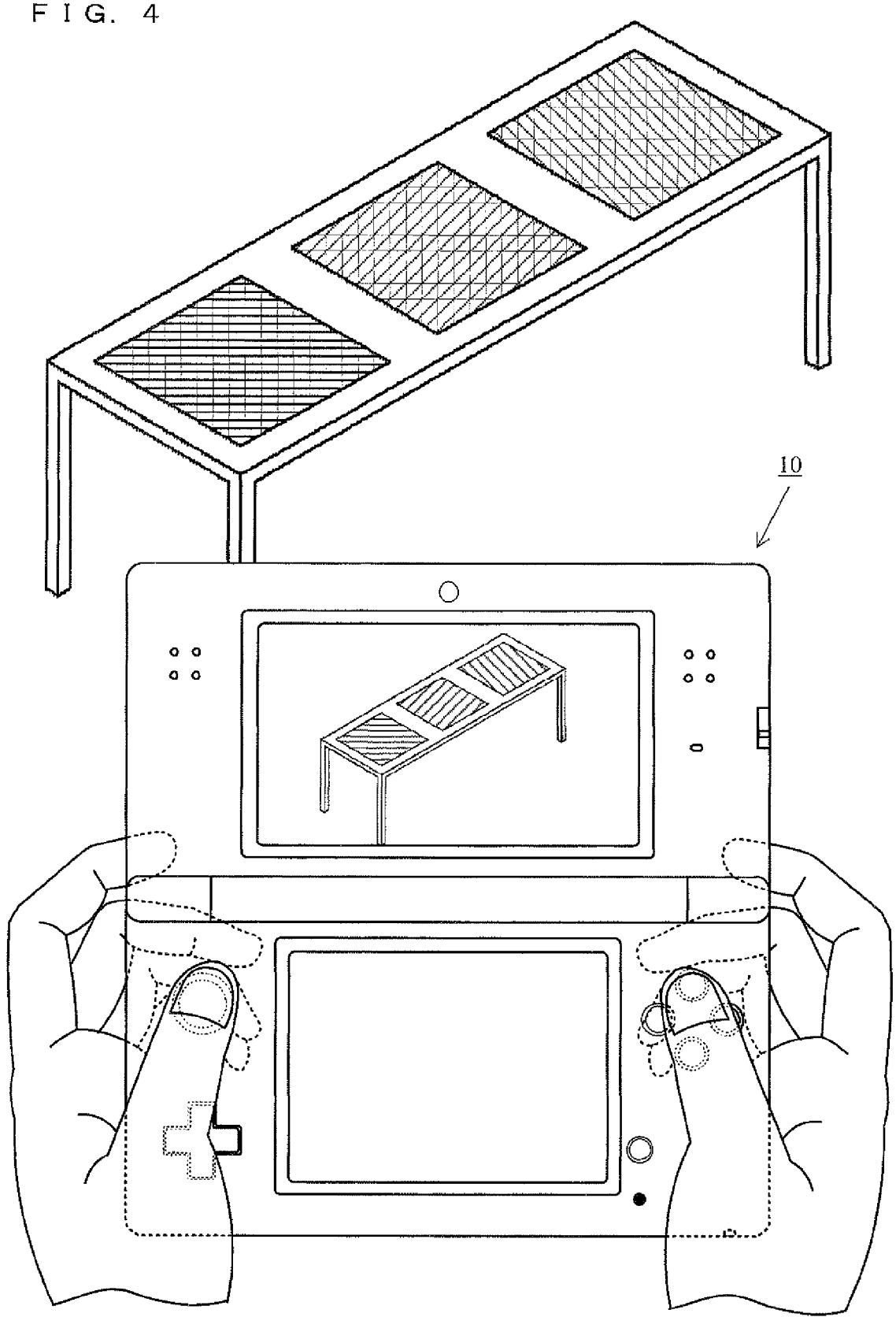
FIG. 4 is a diagram showing an example of a user holding the game apparatus 10 with both hands.

Next, with reference to FIG. 4, an example is shown of the state of the use of the game apparatus 10. It should be noted that FIG. 4 is a diagram showing an example of a user operating the game apparatus 10 holding it.

As shown in FIG. 4, the user holds the side surfaces and the outer surface (the surface opposite to the inner surface) of the lower housing 11 with both palms, middle fingers, ring fingers, and little fingers, such that the lower LCD 12 and the upper LCD 22 face the user. Such holding enables the user to perform operations on the operation buttons 14A through 14E and the analog stick 15 with their thumbs, and to perform operations on the L button 14G and the R button 14H with their index fingers, while holding the lower housing 11. In the example shown in FIG. 4, on the upper LCD 22, a real world image is displayed that is obtained by capturing the real world on the back surface side of the game apparatus 10 with the left outer capturing section 23a and the right outer capturing section 23b. Further, when an input is provided on the touch panel 13, one of the hands having held the lower housing 11 is released therefrom, and the lower housing 11 is held only with the other hand. This makes it possible to provide an input on the touch panel 13 with the one hand.

Figure 5:
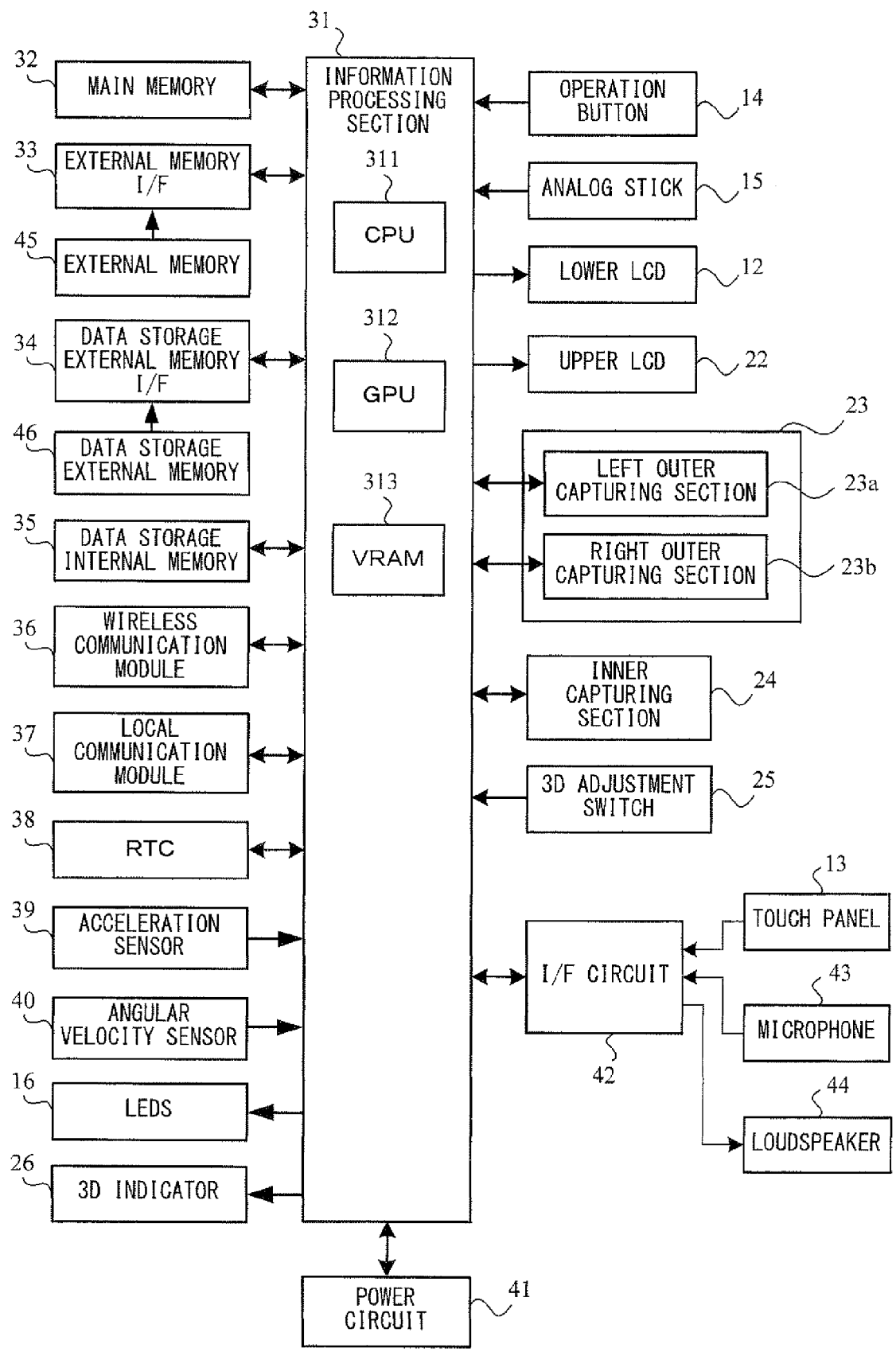
FIG. 5 is a block diagram showing an example of the internal configuration of the game apparatus 10.

Next, with reference to FIG. 5, a description is given of the internal configuration of the game apparatus 10. It should be noted that FIG. 5 is a block diagram showing an example of the internal configuration of the game apparatus 10.

Referring to FIG. 5, the game apparatus 10 includes, as well as the components described above, electronic components, such as an information processing section 31, a main memory 32, an external memory interface (external memory I/F) 33, a data storage external memory I/F 34, a data storage internal memory 35, a wireless communication module 36, a local communication module 37, a real-time clock (RTC) 38, an acceleration sensor 39, an angular velocity sensor 40, a power circuit 41, and an interface circuit (I/F circuit) 42. These electronic components are mounted on electronic circuit boards, and are accommodated in the lower housing 11 (or may be accommodated in the upper housing 21).

The information processing section 31 is information processing means including a central processing unit (CPU) 311 that executes a predetermined program, a graphics processing unit (GPU) 312 that performs image processing, and the like. In the present embodiment, a predetermined program is stored in a memory (e.g., the external memory 45 connected to the external memory I/F 33, or the data storage internal memory 35) included in the game apparatus 10. The CPU 311 of the information processing section 31 executes the predetermined program, and thereby performs display control processing described later or game processing. It should be noted that the program executed by the CPU 311 of the information processing section 31 may be acquired from another device by communication with said another device. The information processing section 31 further includes a video RAM (VRAM) 313. The GPU 312 of the information processing section 31 generates an image in accordance with an instruction from the CPU 311 of the information processing section 31, and draws the image in the VRAM 313. The GPU 312 of the information processing section 31 outputs the image drawn in the VRAM 313 to the upper LCD 22 and/or the lower LCD 12, and the image is displayed on the upper LCD 22 and/or the lower LCD 12.

To the information processing section 31, the main memory 32, the external memory I/F 33, the data storage external memory I/F 34, and the data storage internal memory 35 are connected. The external memory I/F 33 is an interface for establishing a detachable connection with the external memory 45. The data storage external memory I/F 34 is an interface for establishing a detachable connection with the data storage external memory 46.

The main memory 32 is volatile storage means used as a work area or a buffer area of the information processing section 31 (the CPU 311). That is, the main memory 32 temporarily stores various types of data used for display control processing or game processing, and also temporarily stores a program acquired from outside (the external memory 45, another device, or the like) the game apparatus 10. In the present embodiment, the main memory 32 is, for example, a pseudo SRAM (PSRAM).

The external memory 45 is nonvolatile storage means for storing the program executed by the information processing section 31. The external memory 45 is composed of, for example, a read-only semiconductor memory. When the external memory 45 is connected to the external memory I/F 33, the information processing section 31 can load a program stored in the external memory 45. In accordance with the execution of the program loaded by the information processing section 31, a predetermined process is performed. The data storage external memory 46 is composed of a readable/writable non-volatile memory (e.g., a NAND flash memory), and is used to store predetermined data. For example, the data storage external memory 46 stores images captured by the outer capturing section 23 and/or images captured by another device. When the data storage external memory 46 is connected to the data storage external memory I/F 34, the information processing section 31 loads an image stored in the data storage external memory 46, and is capable of causing the image to be displayed on the upper LCD 22 and/or the lower LCD 12.

The data storage internal memory 35 is composed of a readable/writable non-volatile memory (e.g., a NAND flash memory), and is used to store predetermined data. For example, the data storage internal memory 35 stores data and/or programs downloaded by wireless communication through the wireless communication module 36.

The wireless communication module 36 has the function of establishing connection with a wireless LAN by, for example, a method based on the IEEE 802.11.b/g standard. Further, the local communication module 37 has the function of wirelessly communicating with another game apparatus of the same type by a predetermined communication method (e.g., infrared communication). The wireless communication module 36 and the local communication module 37 are connected to the information processing section 31. The information processing section 31 is capable of transmitting and receiving data to and from another device via the Internet, using the wireless communication module 36, and is capable of transmitting and receiving data to and from another game apparatus of the same type, using the local communication module 37.

The acceleration sensor 39 is connected to the information processing section 31. The acceleration sensor 39 detects the magnitudes of the accelerations in the directions of straight lines (linear accelerations) along three axial (x, y, and z axes in the present embodiment) directions, respectively. The acceleration sensor 39 is provided, for example, within the lower housing 11. As shown in FIG. 1, the long side direction of the lower housing 11 is defined as an x-axis direction; the short side direction of the lower housing 11 is defined as a y-axis direction; and the direction perpendicular to the inner surface (main surface) of the lower housing 11 is defined as a z-axis direction. The acceleration sensor 39 thus detects the magnitudes of the linear accelerations produced in the respective axial directions. It should be noted that the acceleration sensor 39 is, for example, an electrostatic capacitance type acceleration sensor, but may be an acceleration sensor of another type. Further, the acceleration sensor 39 may be an acceleration sensor for detecting an acceleration in one axial direction, or accelerations in two axial directions. The information processing section 31 receives data indicating the accelerations detected by the acceleration sensor 39 (acceleration data), and calculates the orientation and the motion of the game apparatus 10.

The angular velocity sensor 40 is connected to the information processing section 31. The angular velocity sensor 40 detects the angular velocities generated about three axes (x, y, and z axes in the present embodiment) of the game apparatus 10, respectively, and outputs data indicating the detected angular velocities (angular velocity data) to the information processing section 31. The angular velocity sensor 40 is provided, for example, within the lower housing 11. The information processing section 31 receives the angular velocity data output from the angular velocity sensor 40, and calculates the orientation and the motion of the game apparatus 10.

The RTC 38 and the power circuit 41 are connected to the information processing section 31. The RTC 38 counts time, and outputs the counted time to the information processing section 31. The information processing section 31 calculates the current time (date) on the basis of the time counted by the RTC 38. The power circuit 41 controls the power from the power supply (the rechargeable battery accommodated in the lower housing 11, which is described above) of the game apparatus 10, and supplies power to each component of the game apparatus 10.

The I/F circuit 42 is connected to the information processing section 31. A microphone 43, a loudspeaker 44, and the touch panel 13 are connected to the I/F circuit 42. Specifically, the loudspeaker 44 is connected to the I/F circuit 42 through an amplifier not shown in the figures. The microphone 43 detects sound from the user, and outputs a sound signal to the I/F circuit 42. The amplifier amplifies the sound signal from the I/F circuit 42, and outputs sound from the loudspeaker 44. The I/F circuit 42 includes: a sound control circuit that controls the microphone 43 and the loudspeaker 44 (amplifier); and a touch panel control circuit that controls the touch panel 13. For example, the sound control circuit performs A/D conversion and D/A conversion on the sound signal, and converts the sound signal into sound data in a predetermined format. The touch panel control circuit generates touch position data in a predetermined format on the basis of a signal from the touch panel 13, and outputs the touch position data to the information processing section 31. The touch position data indicates the coordinates of the position (touch position) at which an input has been provided on the input surface of the touch panel 13. It should be noted that the touch panel control circuit reads a signal from the touch panel 13, and generates the touch position data, once in a predetermined time. The information processing section 31 acquires the touch position data, and thereby recognizes the touch position, at which the input has been provided on the touch panel 13.

An operation button 14 includes the operation buttons 14A through 14L described above, and is connected to the information processing section 31. Operation data is output from the operation button 14 to the information processing section 31, the operation data indicating the states of inputs provided to the respective operation buttons 14A through 14I (indicating whether or not the operation buttons 14A through 14I have been pressed). The information processing section 31 acquires the operation data from the operation button 14, and thereby performs processes in accordance with the inputs provided on the operation button 14.

The lower LCD 12 and the upper LCD 22 are connected to the information processing section 31. The lower LCD 12 and the upper LCD 22 each display an image in accordance with an instruction from the information processing section 31 (the GPU 312). In the present embodiment, the information processing section 31 causes an image for an input operation to be displayed on the lower LCD 12, and causes an image acquired from either one of the outer capturing section 23 and the inner capturing section 24 to be displayed on the upper LCD 22. That is, for example, the information processing section 31 causes a stereoscopic image (stereoscopically visible image) using a right-eye image and a left-eye image to be displayed on the upper LCD 22, the images captured by the inner capturing section 24, or causes a planar image using one of a right-eye image and a left-eye image to be displayed on the upper LCD 22, the images captured by the outer capturing section 23.

Specifically, the information processing section 31 is connected to an LCD controller (not shown) of the upper LCD 22, and causes the LCD controller to set the parallax barrier to on/off When the parallax barrier is on in the upper LCD 22, a right-eye image and a left-eye image that are stored in the VRAM 313 of the information processing section 31 (that are captured by the outer capturing section 23) are output to the upper LCD 22. More specifically, the LCD controller repeatedly alternates the reading of pixel data of the right-eye image for one line in the vertical direction, and the reading of pixel data of the left-eye image for one line in the vertical direction, and thereby reads the right-eye image and the left-eye image from the VRAM 313. Thus, the right-eye image and the left-eye image are each divided into strip images, each of which has one line of pixels placed in the vertical direction, and an image including the divided left-eye strip images and the divided right-eye strip images alternately placed is displayed on the screen of the upper LCD 22. The user may view the images through the parallax barrier of the upper LCD 22, whereby the right-eye image is viewed with the user's right eye, and the left-eye image is viewed with the user's left eye. This causes the stereoscopically visible image to be displayed on the screen of the upper LCD 22.

The outer capturing section 23 and the inner capturing section 24 are connected to the information processing section 31. The outer capturing section 23 and the inner capturing section 24 each capture an image in accordance with an instruction from the information processing section 31, and output data of the captured image to the information processing section 31. In the present embodiment, the information processing section 31 gives either one of the outer capturing section 23 and the inner capturing section 24 an instruction to capture an image, and the capturing section that has received the instruction captures an image, and transmits data of the captured image to the information processing section 31. Specifically, the user selects the capturing section to be used, through an operation using the touch panel 13 and the operation button 14. The information processing section 31 (the CPU 311) detects that a capturing section has been selected, and the information processing section 31 gives an instruction to capture an image to the selected one of the outer capturing section 23 and the inner capturing section 24.

The 3D adjustment switch 25 is connected to the information processing section 31. The 3D adjustment switch 25 transmits an electrical signal corresponding to the position of the slider to the information processing section 31.

The 3D indicator 26 is connected to the info illation processing section 31. The information processing section 31 controls whether or not the 3D indicator 26 is to be lit on. When, for example, the upper LCD 22 is in the stereoscopic display mode, the information processing section 31 lights on the 3D indicator 26.

Figure 6A:
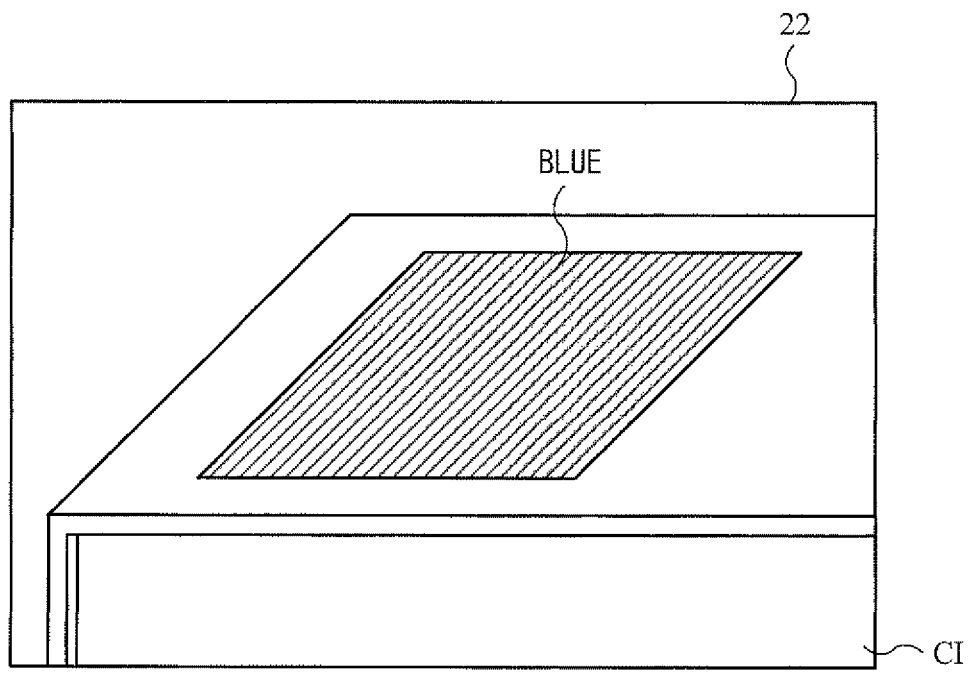
FIG. 6A is a diagram showing an example where a camera image CI including a blue subject is displayed on an upper LCD 22.
Figure 6B:
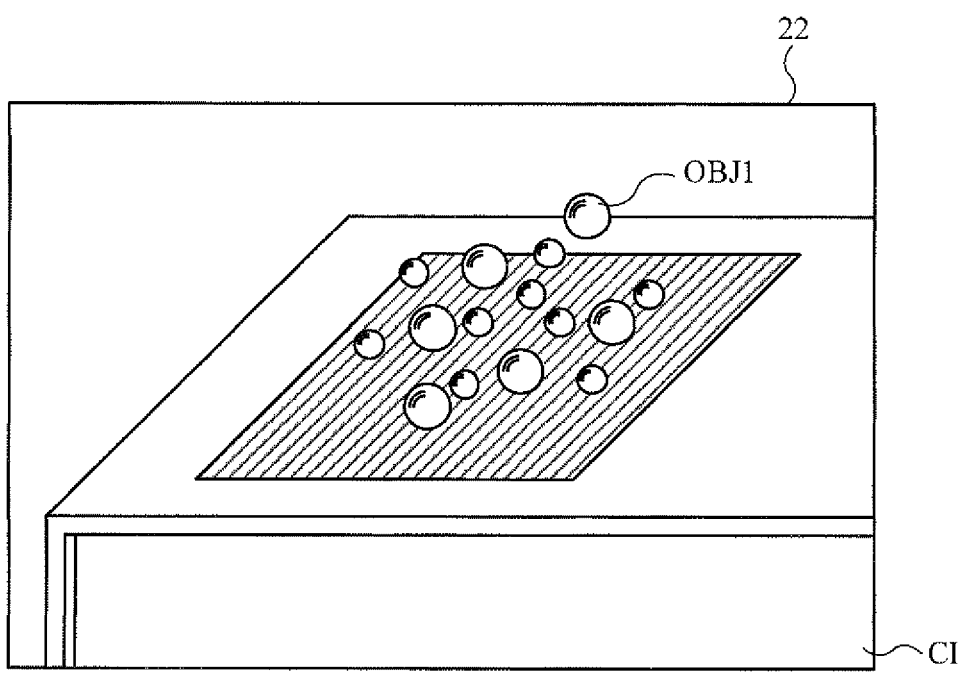
Figure 7A:
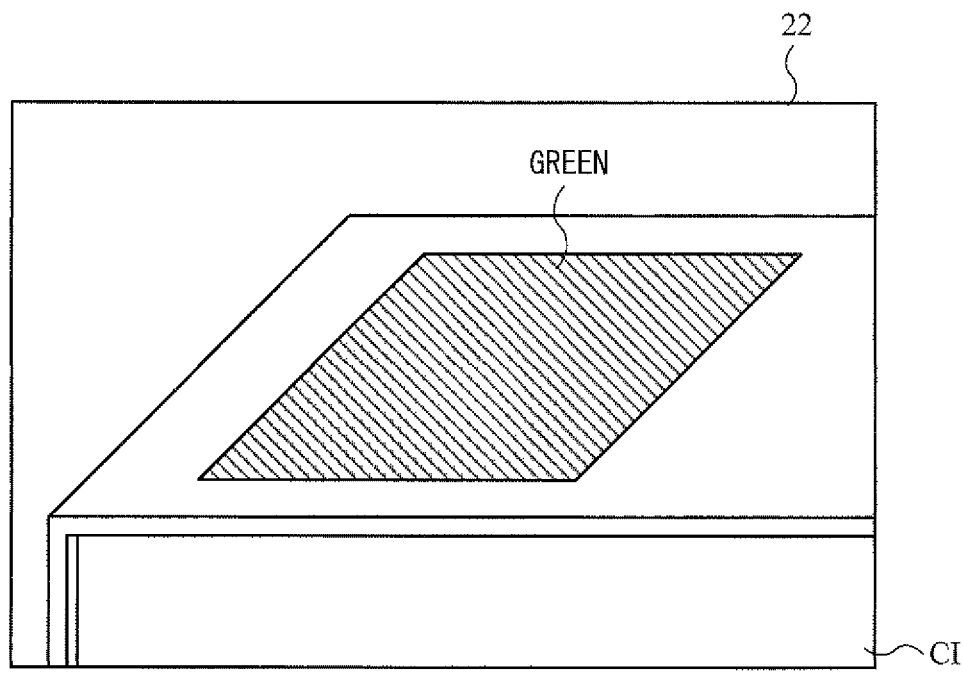
FIG. 7A is a diagram showing an example where the camera image CI including a green subject is displayed on the upper LCD 22.
Figure 7B:
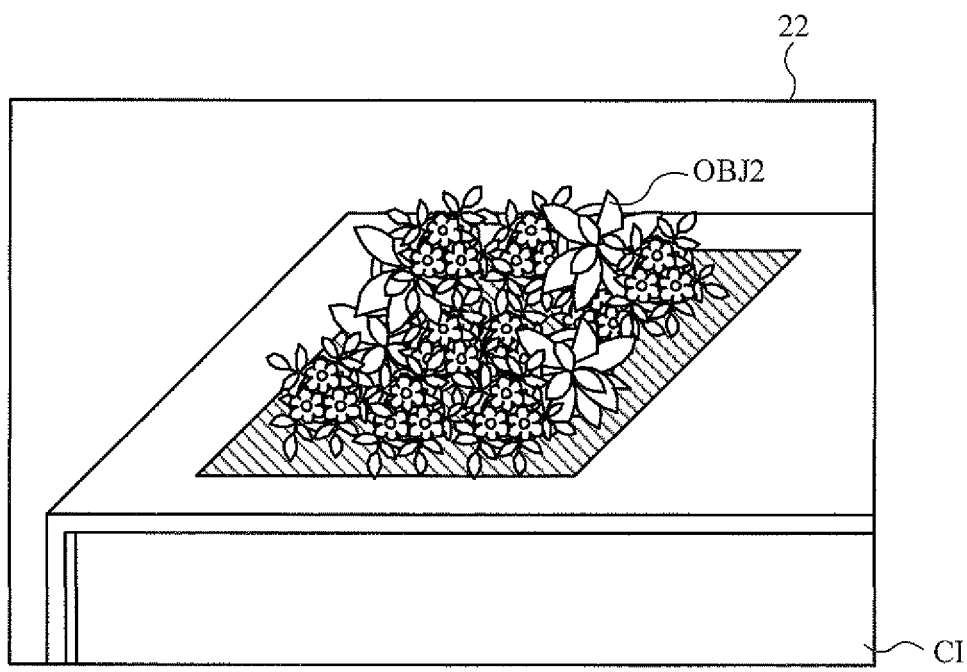
FIG. 7B is a diagram showing an example where display is performed on the upper LCD 22 such that a target object OBJ2 has appeared from the green subject included in the camera image CI.
Figure 8A:
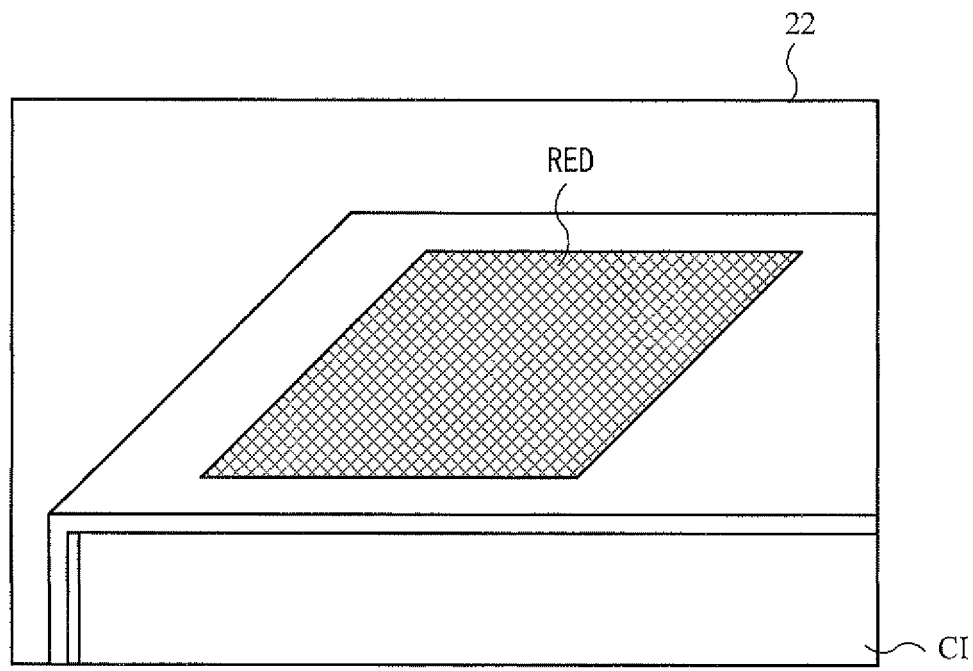
FIG. 8A is a diagram showing an example where the camera image CI including a red subject is displayed on the upper LCD 22.
Figure 8B:
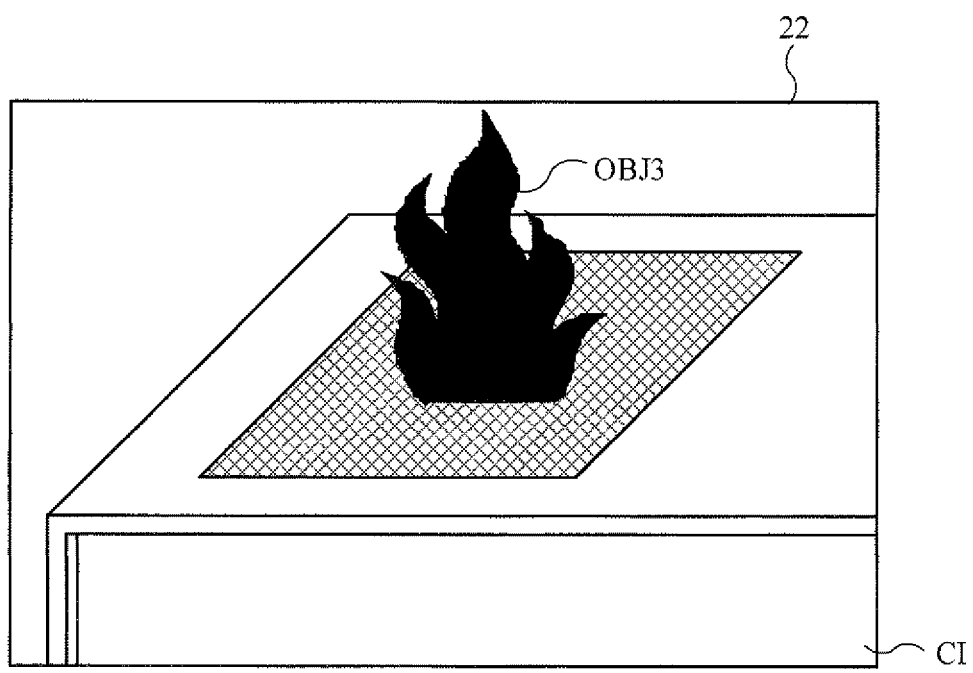
FIG. 8B is a diagram showing an example where display is performed on the upper LCD 22 such that a target object OBJ3 has appeared from the red subject included in the camera image CI.

Next, before a description is given of specific display control processing operations performed by the display control program executed by the game apparatus 10, a description is given, with reference to FIGS. 6A through 8B, of examples of the forms of display performed on the upper LCD 22 by the display control processing operations. It should be noted that FIG. 6A is a diagram showing an example where a camera image CI including a blue subject is displayed on the upper LCD 22. FIG. 6B is a diagram showing an example where display is performed on the upper LCD 22 such that a target object OBJ1 has appeared from the blue subject included in the camera image CI. FIG. 7A is a diagram showing an example where the camera image CI including a green subject is displayed on the upper LCD 22. FIG. 7B is a diagram showing an example where display is performed on the upper LCD 22 such that a target object OBJ2 has appeared from the green subject included in the camera image CL FIG. 8A is a diagram showing an example where the camera image CI including a red subject is displayed on the upper LCD 22. FIG. 8B is a diagram showing an example where display is performed on the upper LCD 22 such that a target object OBJ3 has appeared from the red subject included in the camera image CI. It should be noted that for ease of description, an example is where a planar image (a planar view image, as opposed to the stereoscopically visible image described above) of the real world on the basis of a camera image CI acquired from either one of the outer capturing section 23 and the inner capturing section 24 is displayed on the upper LCD 22.

In FIG. 6A, on the upper LCD 22, a camera image CI is displayed, which is a real world image captured by a real camera built into the game apparatus 10 (e.g., the outer capturing section 23). For example, a real-time real world image (moving image) captured by the real camera built into the game apparatus 10 is displayed on the upper LCD 22.

When, in the camera image CI displayed on the upper LCD 22, a blue subject is captured so as to have a predetermined size or greater and satisfies the conditions for the appearance of the target object, the target object OBJ1 appears from the blue subject portion (the state of FIG. 6B). In the example shown in FIG. 6B, a plurality of water droplets have appeared as the target object OBJ1 from near the center of the blue subject portion included in the camera image CI.

In FIG. 7A, a green subject is displayed in the camera image CI displayed on the upper LCD 22. When the green subject included in the camera image CI has a predetermined size or greater and satisfies the conditions for the appearance of the target object, the target object OBJ2 appears from the green subject portion (the state of FIG. 7B). In the example shown in FIG. 7B, plants and flowers have appeared as the target object OBJ2 from near the center of the green subject portion included in the camera image CI.

In FIG. 8A, a red subject is displayed in the camera image CI displayed on the upper LCD 22. When the red subject included in the camera image CI has a predetermined size or greater and satisfies the conditions for the appearance of a target object, the target object OBJ3 appears from the red subject portion (the state of FIG. 8B). In the example shown in FIG. 8B, a flame has appeared as the target object OBJ3 from near the center of the red subject portion included in the camera image CI.

As described above, when subjects of specific colors (blue, green, and red in the above examples) are included in a captured image of the real world that is being captured by the user themselves, the target objects OBJ1 through OBJ3 are displayed on the upper LCD 22 as if generated from the respective subjects. For example, the target objects OBJ1 through OBJ3 are placed in a virtual space, and an image of the virtual space, in which the target objects OBJ1 through OBJ3 are viewed from a virtual camera (e.g., a computer graphics image; hereinafter referred to as a "virtual world image"), is combined with the real world image obtained from the camera image CI. Thus, the target objects OBJ1 through OBJ3 are displayed on the upper LCD 22 as if having appeared in real space. Then, in accordance with an attack operation using the game apparatus 10 (e.g., pressing the button 14B (A button)), a bullet object BO is fired in a predetermined direction (e.g., the direction of the line of sight of the real camera that is capturing the camera image CI, and the direction of the line of sight of the virtual camera), and the target objects OBJ1 through OBJ3 serve as targets of attack for the user.

It should be noted that the bullet object BO corresponds to an operation object that appears when the user indicates a predetermined operation input, and that provides predetermined points when a predetermined positional relationship (e.g., collision) has been obtained between the bullet object BO and the target objects OBJ1 through OBJ3 in the virtual world. An example of the operation object is a projectile object with which the user hits the target objects OBJ1 through OBJ3. Here, examples of the "operation object" used in the present specification include bullets, shells, bombs, grenades, rockets, missiles, balls, arrows, beams, and laser beams, in the virtual game world.

Here, as described above, the real-time real world image captured by the real camera built into the game apparatus 10 is displayed on the upper LCD 22. Accordingly, changes in the direction and the position of the game apparatus 10 in real space also change the capturing range captured by the game apparatus 10, and therefore also change the camera image CI displayed on the upper LCD 22. In this case, the game apparatus 10 changes the position and the direction of the virtual camera in the virtual space in accordance with the motion of the game apparatus 10 in real space. Consequently, the target objects OBJ1 through OBJ3 displayed as if placed in real space are displayed as if placed at the same positions in real space even when the direction and the position of the game apparatus 10 have changed in real space. For example, when the capturing direction of the real camera of the game apparatus 10 has been turned left from the state where the camera image CI is captured as shown in FIG. 6B, the display position of the target object OBJ1 displayed on the upper LCD 22 moves in the direction opposite to the turn in the capturing direction of the real camera (in the right direction), that is, the direction of the virtual camera in the virtual space, where the target object OBJ1 is placed, moves to the left as does that of the real camera. Thus, even when changes in the direction and the position of the game apparatus 10 also change the capturing range of the real camera, the target objects OBJ1 through OBJ3 are displayed on the upper LCD 22 as if placed in a real space represented by the camera image CI.

As described above, display is performed on the upper LCD 22 such that the target objects OBJ1 through OBJ3 appear from specific-colored subjects included in the real world image, and the target objects OBJ1 through OBJ3 having appeared are displayed on the upper LCD 22 as if placed in a real space represented by the real world image. Here, to detect a specific color from the real world image, it is possible to use color information of each pixel in the real world image. The color information of each pixel may possibly include, for example, the RGB values, the value representing the hue, the value representing the saturation, and the value representing the brightness. In the present embodiment, any of these values may be used.

As a first example, the specific color is detected by combining the above values. Specifically, when the value representing the saturation and the value representing the brightness are equal to or greater than predetermined thresholds, respectively, and the value representing the hue is included within a range indicating the specific color, it is determined that the pixel represents the specific color. Such a determination of the specific color by combining a plurality of items of the color information makes it possible to bring the determination result close to the color recognition normally performed by the user to make a distinction, while preventing erroneous determinations.

As a second example, the specific color is detected using any one of the above values. As an example, it is possible to distinguish in the real world image a pixel having a brightness equal to or greater than a predetermined threshold, using only the value representing the brightness. In this case, it is possible to perform display control processing where a target object OBJ is caused to appear from a subject included in the real world image and having a brightness equal to or greater than the predetermined threshold. As another example, a pixel satisfying predetermined conditions may be distinguished in the real world image as a pixel having the specific color, using only the RGB values, only the value representing the hue, or only the value representing the saturation.

It should be noted that the target object OBJ that appears from the specific-colored subject may change in size when appearing, depending on the size of the subject in the real world image. Further, the target object OBJ that appears may be displayed on the upper LCD 22 without being combined with the real world image. In this case, the real world image captured by the real camera built into the game apparatus 10 is not displayed on the upper LCD 22, and when a specific-colored subject having a predetermined size or greater is included in the capturing range of the real camera, the target object OBJ corresponding to the captured specific color is displayed on the upper LCD 22. That is, only the virtual space viewed from the virtual camera, which changes its capturing direction in a similar manner to the real camera, is displayed on the upper LCD 22. In this case, however, the real world image captured by the real camera may be displayed on the lower LCD 12.

It should be noted that in the examples described above, a game is achieved where the bullet object BO is fired in a predetermined direction in accordance with an attack operation using the game apparatus 10, and the target objects OBJ1 through OBJ3 serve as targets of attack for the user. Alternatively, it is also possible to achieve a game where an object (enemy object) other than the target objects OBJ1 through OBJ3 also serves as a target of attack. In this game, a camera image (real world image) is used as a background image, and the enemy object is placed in the same virtual space where the target objects OBJ1 through OBJ3 appear, and moves in the virtual space on the basis of a predetermined algorithm. Then, the user can score predetermined points when a predetermined positional relationship (e.g., collision) has been obtained between the enemy object and the bullet object BO in the virtual space. This game is one where, on the assumption of the game using such an enemy object as a target of attack: the colors of subjects are detected in the real world image; also the target objects OBJ1 through OBJ3 other than the enemy object are caused to appear from the respective subjects; and more points are added when a predetermined positional relationship (e.g., collision) has been obtained between the target objects OBJ1 through OBJ3 and the bullet object BO. Accordingly, the user can enjoy the game of scoring points by providing the bullet object BO with a predetermined positional relationship with the enemy object, and further enjoy the game by scoring more points by moving the real camera to cause the target objects OBJ1 through OBJ3 to appear on the basis of the color information, and providing the bullet object BO with a predetermined positional relationship with the target objects OBJ1 through OBJ3 other than the enemy object. For example, the simultaneous progression of: the game where the enemy object placed in the virtual world is defeated; and the game where the target objects OBJ1 through OBJ3 are caused to appear in the same virtual world by capturing specific colors as subjects, and serve as scoring targets, can increase the complexities of a game and therefore enhance the user's interest.

Figure 9:
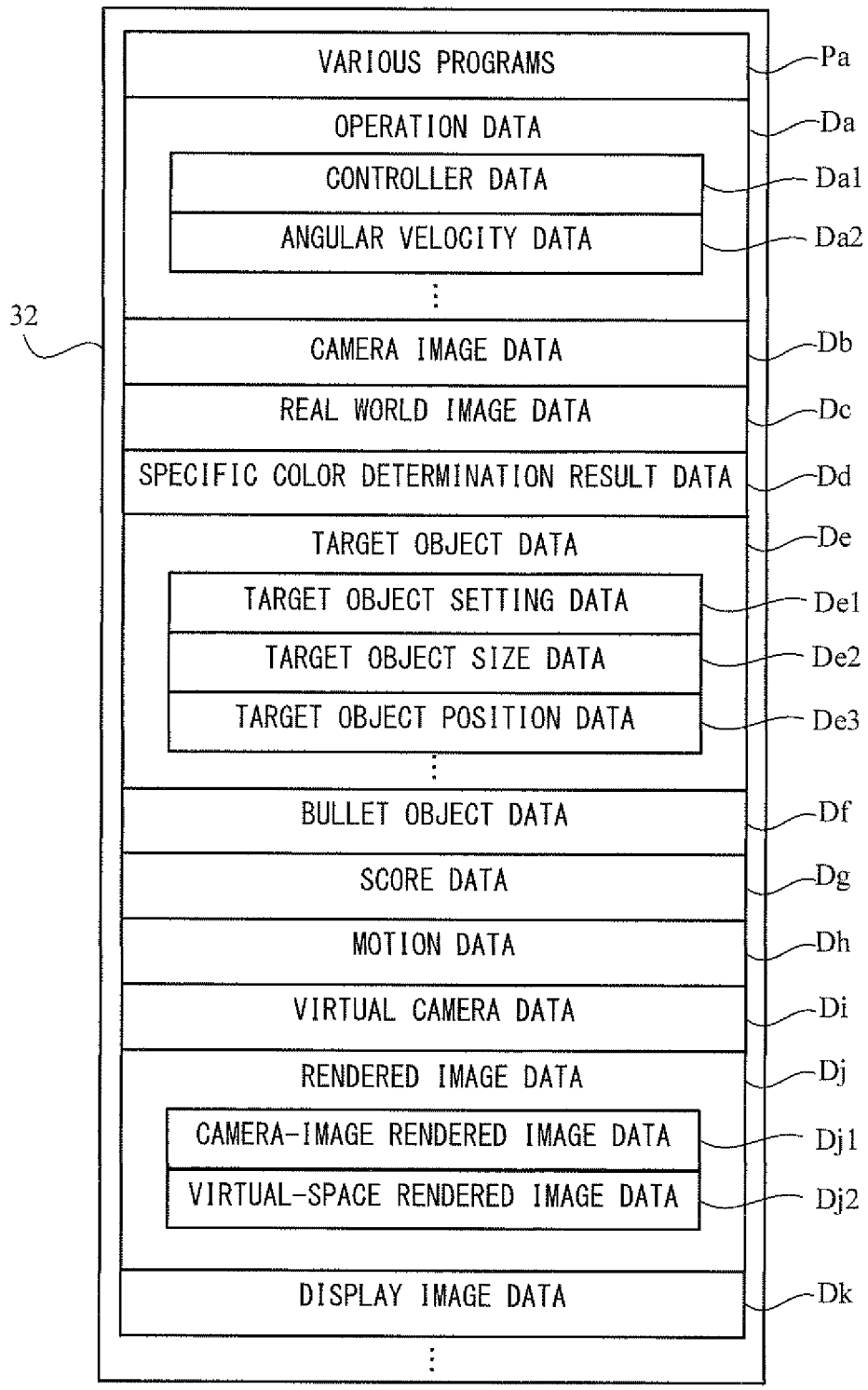
FIG. 9 is a diagram showing an example of various data stored in a main memory 32 in accordance with the execution of a display control program to be executed by the game apparatus 10 of FIG. 1.
Figure 12:
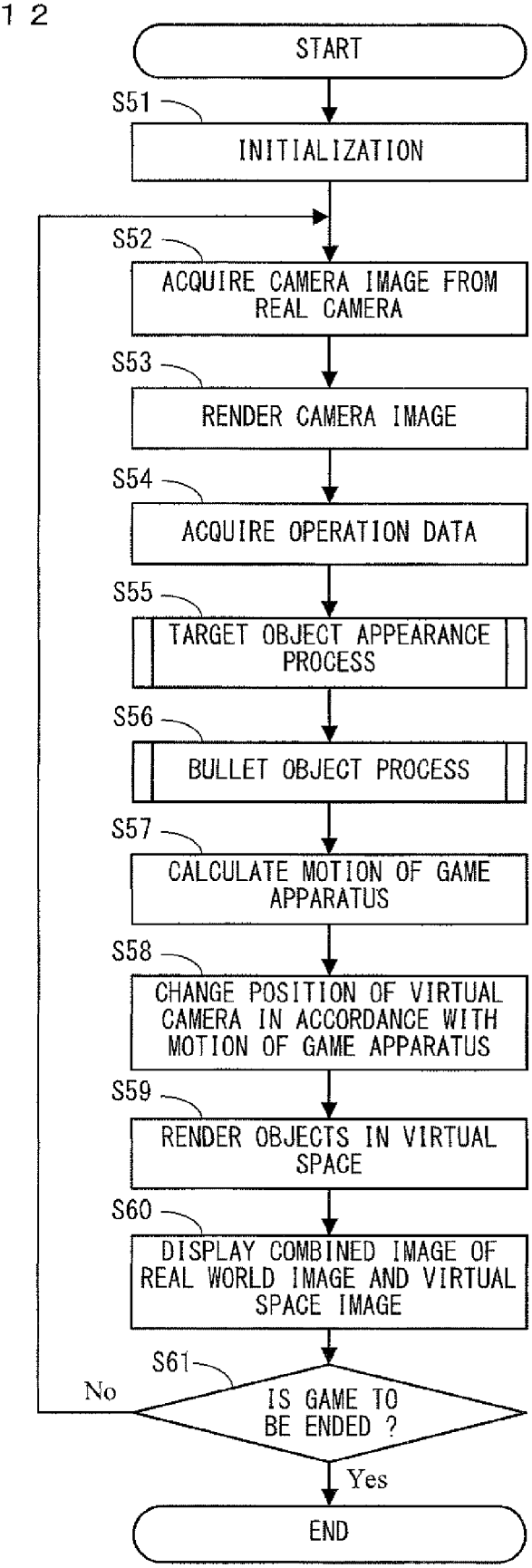
FIG. 12 is a flow chart showing an example of the operation of display control processing performed by the game apparatus 10 in accordance with the execution of the display control program to be executed by the game apparatus 10 of FIG. 1.
Figure 13:
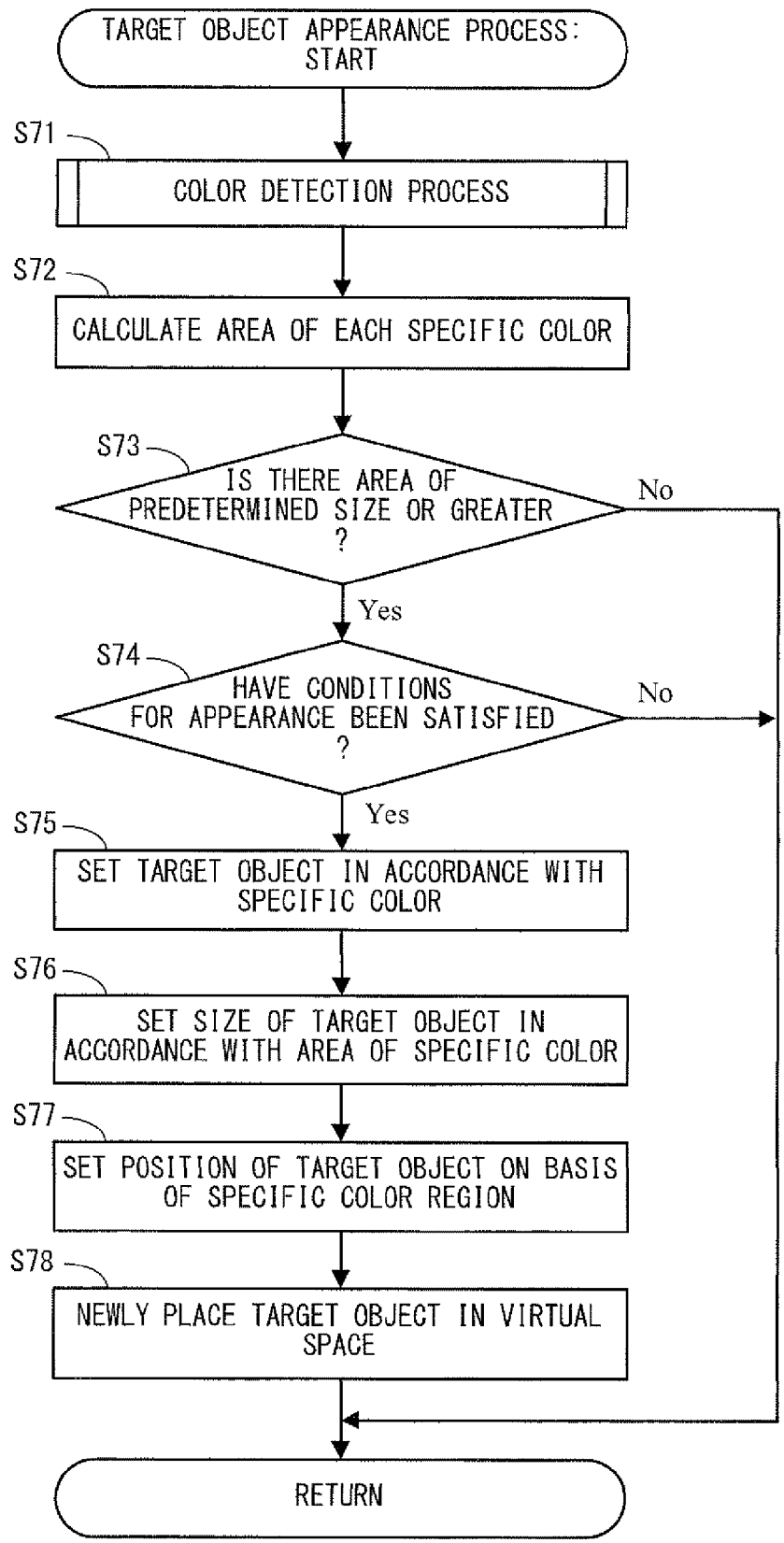
FIG. 13 is a subroutine flow chart showing an example of a detailed operation of a target object appearance process performed in step 55 of FIG. 12.
Figure 14:
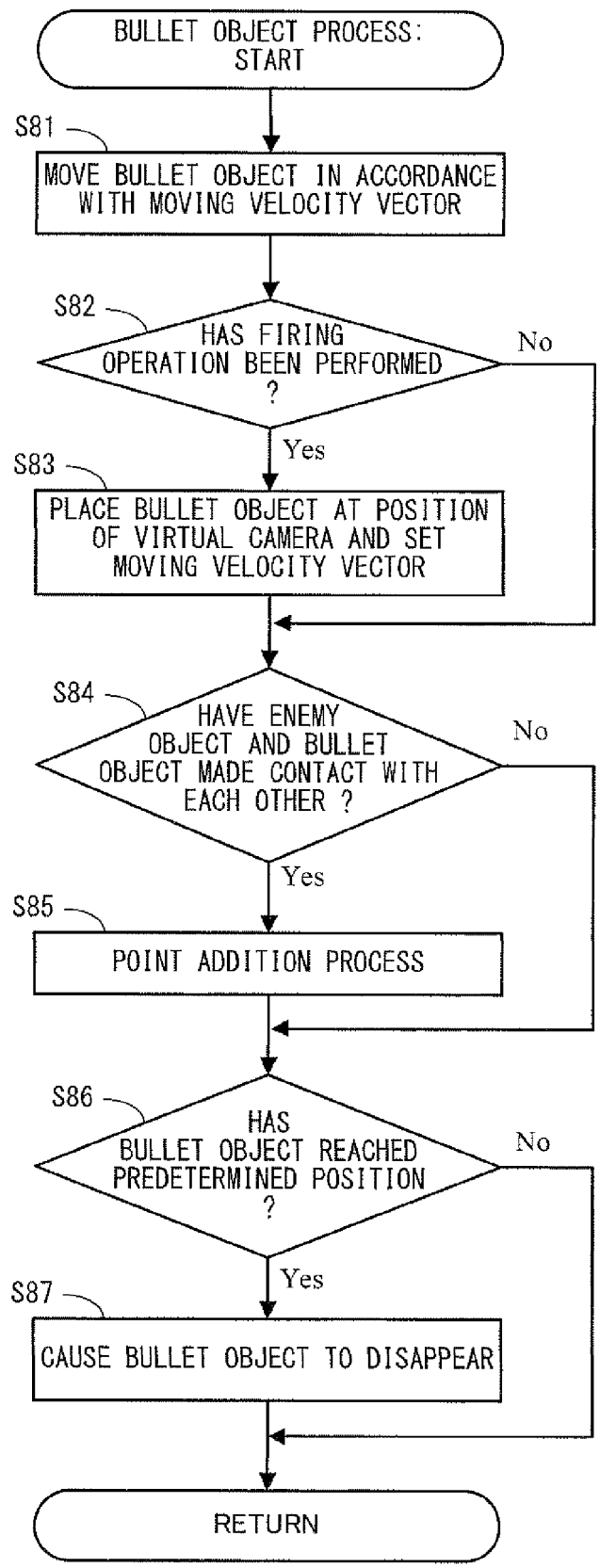
FIG. 14 is a subroutine flow chart showing an example of a detailed operation of a bullet object process performed in step 56 of FIG. 12.
Figure 15:
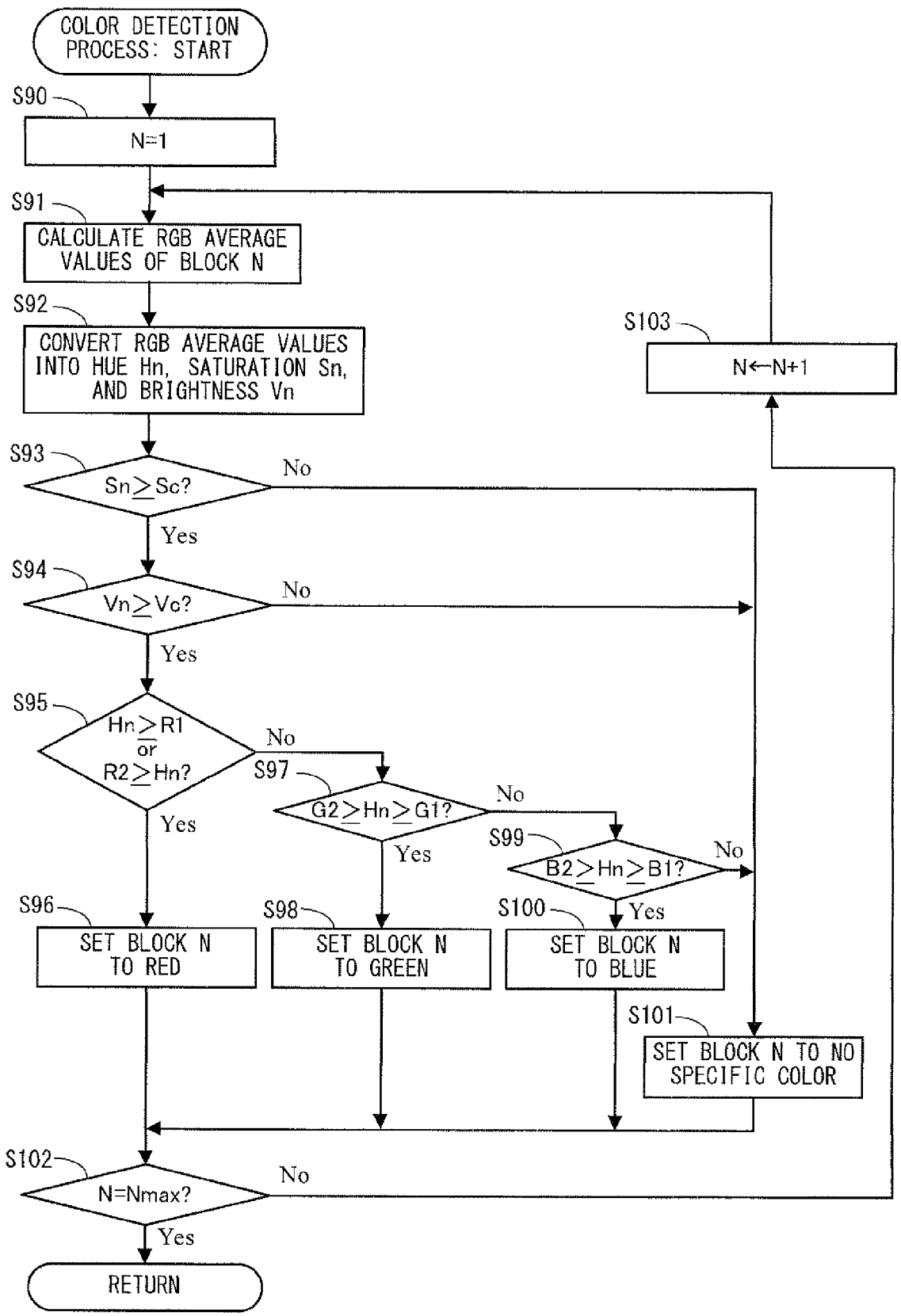
FIG. 15 is a subroutine flow chart showing an example of a detailed operation of a color detection process performed in step 71 of FIG. 13.

Next, with reference to FIGS. 9 through 15, a description is given of the specific processing operations performed by the display control program executed by the game apparatus 10. It should be noted that FIG. 9 is a diagram showing an example of various data stored in the main memory 32 in accordance with the execution of the display control program. FIG. 10 is a diagram showing an example of specific color determination result data Dd of FIG. 9. FIG. 11 is a diagram showing an example of target object setting data De1 of FIG. 9. FIG. 12 is a flow chart showing an example of the operation of display control processing performed by the game apparatus 10 in accordance with the execution of the display control program. FIG. 13 is a subroutine flow chart showing an example of a detailed operation of a target object appearance process performed in step 55 of FIG. 12. FIG. 14 is a subroutine flow chart showing an example of a detailed operation of a bullet object process performed in step 56 of FIG. 12. FIG. 15 is a subroutine flow chart showing an example of a detailed operation of a color detection process performed in step 71 of FIG. 13. It should be noted that programs for performing these processes are included in a memory built into the game apparatus 10 (e.g., the data storage internal memory 35), or included in the external memory 45 or the data storage external memory 46, and the programs are: loaded from the built-in memory, or loaded from the external memory 45 through the external memory I/F 33 or from the data storage external memory 46 through the data storage external memory I/F 34, into the main memory 32 when the game apparatus 10 is turned on; and executed by the CPU 311.

Referring to FIG. 9, the main memory 32 stores the programs loaded from the built-in memory, the external memory 45, or the data storage external memory 46, and temporary data generated in the display control processing. Referring to FIG. 9, the following are stored in a data storage area of the main memory 32: operation data Da; camera image data Db; real world image data Dc; specific color determination result data Dd; target object data De; bullet object data Df; score data Dg; motion data Dh; virtual camera data Di; rendered image data Dj; display image data Dk; and the like. Further, in a program storage area of the main memory 32, a group of various programs Pa are stored that configure the display control program.

The operation data Da indicates operation information of the operation of the user on the game apparatus 10. The operation data Da includes controller data Da1 and angular velocity data Da2. The controller data Da1 indicates that the user has operated a controller, such as the operation button 14 or the analog stick 15, of the game apparatus 10. The angular velocity data Da2 indicates the angular velocities detected by the angular velocity sensor 40. For example, the angular velocity data Da2 includes x-axis angular velocity data indicating an angular velocity about the x-axis, y-axis angular velocity data indicating an angular velocity about the y-axis, and z-axis angular velocity data indicating an angular velocity about the z-axis, the angular velocities detected by the angular velocity sensor 40. For example, the operation data from the operation button 14 or the analog stick 15 and the angular velocity data from the angular velocity sensor 40 are acquired per unit of time in which the game apparatus 10 performs processing (e.g., 1/60 seconds), and are stored in the controller data Da1 and the angular velocity data Da2, respectively, in accordance with the acquisition, to thereby be updated.

It should be noted that a process flow will be described later using an example where the controller data Da1 and the angular velocity data Da2 are each updated every one-frame period, which corresponds to the processing cycle. Alternatively, the controller data Da1 and the angular velocity data Da2 may be updated in another processing cycle. For example, the controller data Da1 may be updated in each cycle of detecting the operation of the user on a controller, such as the operation button 14 of the analog stick 15, and the updated controller data Da1 may be used in each processing cycle. In this case, the cycles of updating the controller data Da1 and the angular velocity data Da2 differ from the processing cycle.

The camera image data Db indicates a camera image captured by either one of the outer capturing section 23 and the inner capturing section 24. In the following descriptions of processing, in the step of acquiring a camera image, the camera image data Db is updated using a camera image captured by either one of the outer capturing section 23 and the inner capturing section 24. It should be noted that the cycle of updating the camera image data Db using the camera image captured by the outer capturing section 23 or the inner capturing section 24 may be the same as the unit of time in which the game apparatus 10 performs processing (e.g., 1/60 seconds), or may be shorter than this unit of time. When the cycle of updating the camera image data Db is shorter than the cycle of the game apparatus 10 performing processing, the camera image data Db may be updated as necessary, independently of the processing described later. In this case, in the step described later of acquiring a camera image, the process may be performed invariably using the most recent camera image indicated by the camera image data Db.

The real world image data Dc is data for generating a real world image representing the camera image captured by the real camera of the game apparatus 10 (the outer capturing section 23 or the inner capturing section 24). For example, the real world image data Dc includes: data of a planar polygon for generating the real world image; texture data of the camera image to be mapped onto the planar polygon; and data indicating the position of the planar polygon.

The specific color determination result data Dd indicates specific colors determined in the real world image. With reference to FIG. 10, an example of the specific color determination result data Dd is described below.

Referring to FIG. 10, as an example, the camera image captured by either one of the outer capturing section 23 and the inner capturing section 24 (hereinafter referred to simply as a "camera image") is divided into blocks each having a predetermined size (e.g., a block of 8×8 pixels), and the presence or absence of a specific color is determined for each block. Specifically, the camera image is divided into Nmax blocks, and block numbers 1 through Nmax are assigned to the respective blocks. Then, in the specific color determination result data Dd, the following are described for each block: the RGB average values; the value representing a hue H; the value representing a saturation S; the value representing a brightness V; and specific color setting parameters indicating the determined specific color. For example, in the block of the block number 1: the RGB average values are R1, G1, and B1; the value representing the hue H is H1; the value representing the saturation S is S1; the value representing the brightness V is V1; and the specific color setting parameters indicate that it is determined that the block does not have a specific color. Further, in the block of the block number 2: the RGB average values are R2, G2, and B2; the value representing the hue H is H2; the value representing the saturation S is S2; the value representing the brightness V is V2; and the specific color setting parameters indicate that it is determined that the block is blue.

Referring back to FIG. 9, the target object data De is data concerning the target objects OBJ1 through OBJ3 described above, and includes target object setting data De1, target object size data De2, and target object position data De3. The target object setting data De1 indicates target objects that appear in accordance with determined specific colors, and is set in advance for each specific color that can be determined. For example, as shown in FIG. 11, the target object setting data De1 is set such that when the determined specific color is "red", a flame appears as a target object. Further, the target object setting data De1 is set such that when the determined specific color is "green", plants and flowers appear as a target object. Furthermore, the target object setting data De1 is set such that when the determined specific color is "blue", water droplets appear as a target object. The target object size data De2 indicates the size of each target object when caused to appear in combination with the real world image. The target object position data De3 indicates the placement position, the placement direction, and the like, in the virtual space, of each target object when caused to appear in combination with the real world image.

The bullet object data Df is data concerning the bullet object BO, which is fired in accordance with an attack operation. For example, the bullet object data Df includes: data indicating the position of the bullet object BO; and data indicating the moving velocity and the moving direction (e.g., the moving velocity vector) of the bullet object BO.

The score data Dg indicates the score of the game where the target objects OBJ1 through OBJ3 appear. For example, points are added to the score of the game when the bullet object BO has hit the target objects OBJ1 through OBJ3 by an attack operation.

The motion data Dh indicates the motion of the game apparatus 10 in real space. As an example, the motion of the game apparatus 10 is calculated by the angular velocities detected by the angular velocity sensor 40.

The virtual camera data Di is data concerning the virtual camera set in the virtual space. For example, the position and the direction of the virtual camera in the virtual space change in accordance with the motion of the game apparatus 10 indicated by the motion data Dh.

The rendered image data Dj includes camera-image rendered image data Dj1 and virtual-space rendered image data Dj2. The camera-image rendered image data Dj1 indicates a real world image obtained by rendering with a parallel projection the planar polygon on which the texture of the camera image is mapped. The virtual-space rendered image data Dj2 indicates a virtual world image obtained by rendering with a perspective projection the virtual space where the target objects OBJ1 through OBJ3 are placed.

The display image data Dk indicates a display image to be displayed on the upper LCD 22. For example, the display image to be displayed on the upper LCD 22 is generated by superimposing the virtual world image on the real world image such that the virtual world image is given preference.

Next, with reference to FIG. 12, a description is given of the operation of the information processing section 31. First, when the power (the power button 14F) of the game apparatus 10 is turned on, the CPU 311 executes a boot program (not shown). This causes the programs stored in the built-in memory, the external memory 45, or the data storage external memory 46, to be loaded into the main memory 32. In accordance with the execution of the loaded programs by the information processing section 31 (the CPU 311), the steps (abbreviated as "S" in FIGS. 12 through 15) shown in FIG. 12 are performed. It should be noted that in FIGS. 12 through 15, processes not directly related to the present invention are not described.

Referring to FIG. 12, the information processing section 31 performs the initialization of the display control processing (step 51), and proceeds to the subsequent step. For example, the information processing section 31 sets the initial position and the initial direction of the virtual camera for generating a virtual world image, and sets the coordinate axes (e.g., X, Y, and Z axes) of the virtual space where the virtual camera is placed.

Next, the information processing section 31 acquires a camera image from the real camera of the game apparatus 10 (step 52), and proceeds to the subsequent step. For example, the information processing section 31 updates the camera image data Db using a camera image captured by the currently selected capturing section (the outer capturing section 23 or the inner capturing section 24).

Figure 16:
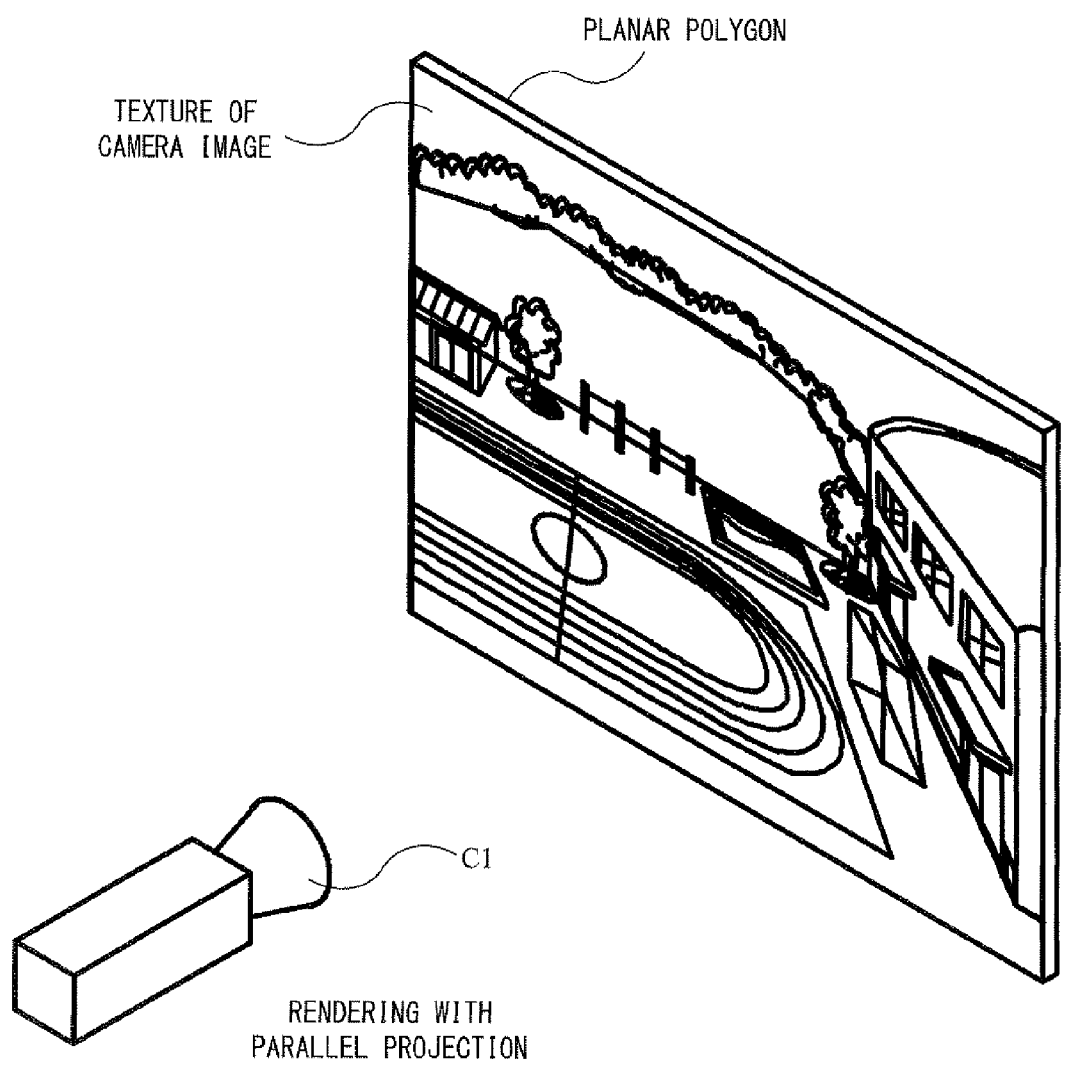
FIG. 16 is a diagram illustrating an example of a process of rendering a camera image.
Figure 17:
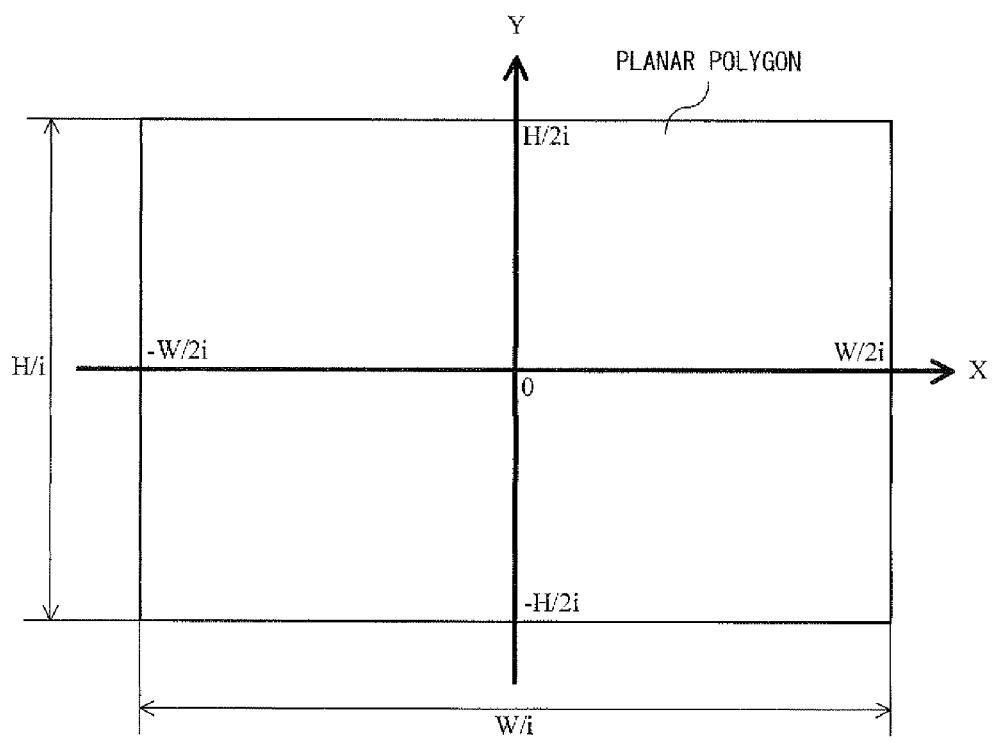
FIG. 17 is a diagram illustrating an example of a coordinate system used to render the camera image.

Next, the information processing section 31 performs a process of rendering the camera image acquired in step 52 described above (step 53), and proceeds to the subsequent step. For example, the information processing section 31 updates the real world image data Dc using the camera image acquired in step 52 described above, and updates the camera-image rendered image data Dj1 using a rendered image. With reference to FIGS. 16 and 17, a description is given below of an example of the process of rendering the camera image.

In the present embodiment, as shown in FIG. 16, a camera image obtained from the real camera of the game apparatus 10 is set as a texture to generate a planar polygon on which the texture is mapped. Then, an image obtained by rendering the planar polygon with a parallel projection from a virtual camera CI is set as a real world image. Here, a description is given of an example of the method of generating a real world image in the case where the virtual camera CI is placed at the center of the display screen of the upper LCD 22, and the entire camera image obtained from the real camera of the game apparatus 10 is displayed on the entire display screen of the upper LCD 22.

First, a planar polygon is considered, on which a texture corresponding to i pixels is mapped in 1 unit of a coordinate system of the virtual space where the planar polygon is placed. In this case, a texture having i pixels×i pixels is mapped onto a region of 1 unit×1 unit of the coordinate system. The display screen of the upper LCD 22 has horizontal W dots×vertical H dots. To place the planar polygon such that the entire texture of the camera image corresponds to the entire display screen having W dots×H dots, and 1 pixel in the texture corresponds to 1 dot on the display screen, the coordinate system may be defined as shown in FIG. 17. That is, an XY coordinate system of the virtual space where the planar polygon is placed is set such that the width of the planar polygon, on the entire main surface of which the texture of the camera image is mapped, corresponds to W/i units of the coordinate system, and the height of the planar polygon corresponds to H/i units of the coordinate system. The planar polygon is placed such that when the center of the main surface of the planar polygon, on which the texture is mapped, coincides with the origin of the XY coordinate system of the virtual space, the horizontal direction of the planar polygon corresponds to the X-axis direction (the right direction is the X-axis positive direction), and the vertical direction of the planar polygon corresponds to the Y-axis direction (the up direction is the Y-axis positive direction). In this case, in the main surface of the planar polygon, on which the texture is mapped: the top right corner position is placed at (X, Y)=(W/

$2i$, H/$2i$); the bottom right corner position is placed at (X, Y)=(W/$2i$, –H/$2i$); the top left corner position is placed at (X, Y)=(–W/$2i$, H/$2i$); and the bottom left corner position is placed at (X, Y)=(–W/$2i$, –H/$2i$). As described above, the planar polygon placed in the coordinate system of the virtual space is rendered with a parallel projection such that 1 pixel on the camera image (texture) corresponds to 1 dot on the display screen. Thus, a real world image is generated that corresponds to the camera image obtained from the real camera of the game apparatus 10.

Referring back to FIG. 12, the information processing section 31 acquires operation data (step 54), and proceeds to the subsequent step. For example, the information processing section 31 acquires data indicating that the operation button 14 or the analog stick 15 has been operated, to thereby update the controller data Da1. Further, the information processing section 31 acquires angular velocity data indicating the angular velocities detected by the angular velocity sensor 40, to thereby update the angular velocity data Da2.

Next, the information processing section 31 performs a target object appearance process (step 55), and proceeds to the subsequent step. With reference to FIG. 13, an example of the target object appearance process is described below.

Referring to FIG. 13, the information processing section 31 performs a color detection process (step 71), and proceeds to the subsequent step. With reference to FIG. 15, an example of the color detection process is described below.

Referring to FIG. 15, the information processing section 31 sets a temporary variable N used in this subroutine to 1 (step 90), and proceeds to the subsequent step.

Next, the information processing section 31 calculates the RGB average values of a block N (step 91), and proceeds to the subsequent step. As described above, the camera image is divided into Nmax blocks. For example, the information processing section 31 extracts the RGB values of pixels corresponding to the block N (e.g., 8×8 pixels) from the camera image indicated by the camera image data Db, and calculates the average values of the respective RGB values. Then, the information processing section 31 updates the specific color determination result data Dd corresponding to the RGB average values of the block N, using the calculated RGB average values.

Next, the information processing section 31 converts the RGB average values calculated in step 91 described above into a hue Hn, a saturation Sn, and a brightness Vn (step 92), and proceeds to the subsequent step. Then, the information processing section 31 updates the specific color determination result data Dd corresponding to the hue H, the saturation S, and the brightness V of the block N, using the values of the hue Hn, the saturation Sn, and the brightness Vn that have been obtained from the conversions.

Here, the conversions of the RGB average values into the hue Hn, the saturation Sn, and the brightness Vn may be performed using a commonly used technique. For example, if each component of the RGB average values (i.e., the values of R, G, and B) is represented as from 0.0 to 1.0; "max" is a maximum value of each component; and "min" is a minimum value of each component, the conversions into the hue Hn are performed by the following formulas.

When, among all the components, the value of R is max:

$$Hn=60\times(G-B)/(max-min)$$

When, among all the components, the value of G is max:

$$Hn=60\times(B-R)/(max-min)+120$$

When, among all the components, the value of B is max:

$$Hn=60\times(R-G)/(max-min)+240$$

It should be noted that when Hn is a negative value as a result of the conversions using the above formulas, 360 is further added to Hn to obtain the hue Hn. Further, the conversions into the saturation Sn and the brightness Vn are performed by the following formulas.

$$Sn=(max-min)/max$$

$$Vn=max$$

When the hue Hn, the saturation Sn, and the brightness Vn are calculated using the above conversion formulas, the hue Hn is obtained in the range of from 0.0 to 360.0; the saturation Sn is obtained in the range of from 0.0 to 1.0; and the brightness Vn is obtained in the range of from 0.0 to 1.0.

Next, the information processing section 31 determines whether or not the saturation Sn calculated in step 92 described above is equal to or greater than a threshold Sc (e.g., Sc=0.43) (step 93). Then, when the saturation Sn is equal to or greater than the threshold Sc, the information processing section 31 proceeds to the subsequent step 94. On the other hand, when the saturation Sn is less than the threshold Sc, the information processing section 31 proceeds to the subsequent step 101.

In step 94, the information processing section 31 determines whether or not the brightness Vn calculated in step 92 described above is equal to or greater than a threshold Vc (e.g., Vc=0.125). Then, when the brightness Vn is equal to or greater than the threshold Vc, the information processing section 31 proceeds to the subsequent step 95. On the other hand, when the brightness Vn is less than the threshold Vc, the information processing section 31 proceeds to the subsequent step 101.

In step 95, the information processing section 31 determines whether or not the hue Hn calculated in step 92 described above is equal to or greater than a threshold R1 (e.g., R1=315.0) or equal to or less than a threshold R2 (e.g., R2=45.0). Then, when the determination of step 95 described above is positive, the information processing section 31 sets the block N to a specific red color to thereby update the specific color determination result data Dd corresponding to the specific color setting of the block N (step 96), and proceeds to the subsequent step 102. On the other hand, when the determination of step 95 described above is negative, the information processing section 31 proceeds to the subsequent step 97.

In step 97, the information processing section 31 determines whether or not the hue Hn calculated in step 92 described above is equal to or greater than a threshold G1 (e.g., G1=75.0) and equal to or less than a threshold G2 (e.g., G2=165.0). Then, when the determination of step 97 described above is positive, the information processing section 31 sets the block N to a specific green color to thereby update the specific color determination result data Dd corresponding to the specific color setting of the block N (step 98), and proceeds to the subsequent step 102. On the other hand, when the determination of step 97 described above is negative, the information processing section 31 proceeds to the subsequent step 99.

In step 99, the information processing section 31 determines whether or not the hue Hn calculated in step 92 described above is equal to or greater than a threshold B1 (e.g., B1=195.0) and equal to or less than a threshold B2 (e.g., B2=285.0). Then, when the determination of step 99 described above is positive, the information processing section 31 sets the block N to a specific blue color to thereby update the specific color determination result data Dd corresponding to the specific color setting of the block N (step 100), and proceeds to the subsequent step 102. On the other hand, when the determination of step 99 described above is negative, the information processing section 31 proceeds to the subsequent step 101.

Meanwhile, in step 101, the information processing section 31 sets the block N to no specific color to thereby update the specific color determination result data Dd corresponding to the specific color setting of the block N, and proceeds to the subsequent step 102. As described above, when the saturation Sn of the block N is less than the threshold Sc, or when the brightness Vn of the block N is less than the threshold Vc, or when the hue I In of the block N is not included in any of the determination ranges used in steps 95, 97, and 98, the block N is set to no specific color.

In step 102, the information processing section 31 determines whether or not the currently set temporary variable N is Nmax. Then, when the temporary variable N is Nmax, the information processing section 31 ends the process of this subroutine. On the other hand, when the temporary variable N has not reached Nmax, the information processing section 31 adds 1 to the currently set temporary variable N to thereby set a new temporary variable (step 103), returns to step 91 described above, and repeats the same process.

Figure 18:
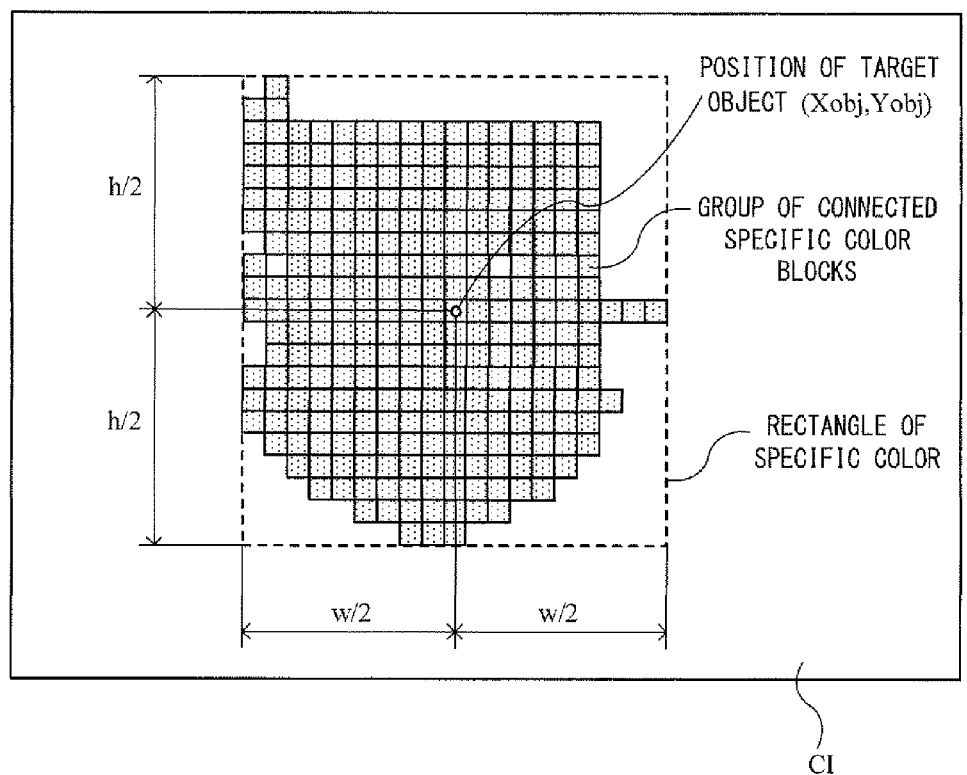
FIG. 18 is a diagram illustrating an example of the relationship between: a group of blocks connected by the same specific color; and the positions of a rectangle and a target object.

Referring back to FIG. 13, after the color detection process in step 71 described above, the information processing section 31 calculates the area of each specific color (step 72), and proceeds to the subsequent step. For example, with reference to the specific color set in the specific color determination result data Dd for each block, the information processing section 31 determines whether or not blocks adjacent in the left-right direction or the up-down direction are set to the same specific color. Then, as shown in FIG. 18, the information processing section 31 defines a group of blocks connected by the same specific color as one figure, sets a rectangle surrounding the figure, and defines the area (size) of the rectangle as the area of the specific color.

Next, the information processing section 31 determines whether or not there is a rectangle of a specific color having an area of a predetermined size or greater (step 73). For example, when, among the rectangles whose areas of the respective specific colors have been calculated in step 72 described above, there is a rectangle that reaches a criterion for determination (e.g., 32 pixels vertically and horizontally or more) defined in advance, the information processing section 31 determines that there is a rectangle of a specific color having an area of a predetermined size or greater. Then, when there is a specific color provided with a rectangle having an area of the predetermined size or greater, the information processing section 31 proceeds to the subsequent step 74. On the other hand, when there is not a specific color provided with a rectangle having an area of the predetermined size or greater, the information processing section 31 ends the process of this subroutine.

In step 74, the information processing section 31 determines whether or not the conditions for the appearance of the target object OBJ have been satisfied. For example, the conditions for the appearance of the target object OBJ may be: that the target object OBJ appears such that the number of target objects OBJ is within a maximum appearance number set for each specific color (e.g., one or less for each specific color); that the target object OBJ appears at predetermined time intervals; that in accordance with the disappearance, from the virtual world, of a target object OBJ having already appeared, a new target object OBJ appears; or that the target object OBJ appears at a random time. Alternatively, the conditions for the appearance of the target object OBJ may also be that in the determination of step 73 described above, a rectangle of a specific color having an area of the predetermined size or greater is detected multiple (e.g., three) consecutive times with the same specific color and at substantially the same position. When the conditions for the appearance of the target object OBJ have been satisfied, the information processing section 31 proceeds to the subsequent step 75. On the other hand, when the conditions for the appearance of the target object OBJ have not been satisfied, the information processing section 31 ends the process of the subroutine.

In step 75, in accordance with the specific color having satisfied the conditions for the appearance in step 74 described above, the information processing section 31 sets the target object to be caused to appear, and proceeds to the subsequent step. For example, the information processing section 31 selects, from among the target objects set in advance in the target object setting data De1, the target object corresponding to the specific color having satisfied the conditions for the appearance.

Next, in accordance with the area of the rectangle of the specific color having satisfied the conditions for the appearance, the information processing section 31 sets the size of the target object to be caused to appear (step 76), and proceeds to the subsequent step. For example, in accordance with the area of the rectangle of the specific color having satisfied the conditions for the appearance in step 74 described above, the information processing section 31 sets the size of the target object to be caused to appear, to thereby update the target object size data De2 using the set size. As an example, when the size of the rectangle of the specific color having satisfied the conditions for the appearance is 120 pixels vertically and horizontally or more, the information processing section 31 sets the size of the target object to be caused to appear to "large". When the size of the rectangle of the specific color having satisfied the conditions for the appearance is 80 pixels vertically and horizontally or more, the information processing section 31 sets the size of the target object to be caused to appear to "medium". When the size of the rectangle of the specific color having satisfied the conditions for the appearance is 32 pixels vertically and horizontally or more, the information processing section 31 sets the size of the target object to be caused to appear to "small".

Next, the information processing section 31 sets the position of the target object on the basis of the region of the specific color having satisfied the conditions for the appearance (step 77), and proceeds to the subsequent step. As an example, as shown in FIG. 18, the position of the target object is set at substantially the center of the group of specific-colored blocks having satisfied the conditions for the appearance (e.g., the center of the rectangle of the specific color). Specifically, the position (Xobj, Yobj) that is the midpoint of the blocks placed at the left and right ends of the group of blocks in the camera image and is also the midpoint of the blocks placed at the upper and lower ends of the group of blocks, i.e., the center of the rectangle surrounding the group of blocks, is set as the position of the target object. Then, the information processing section 31 updates the target object position data De3 using the set position (Xobj, Yobj) of the target object.

Figure 19:
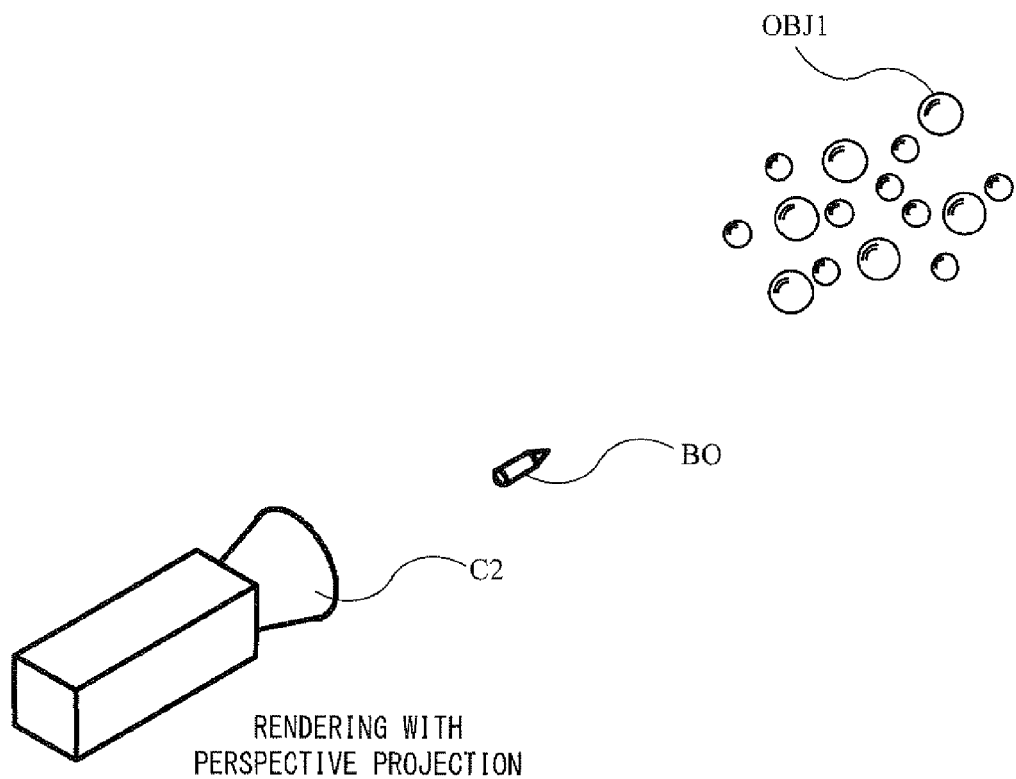
FIG. 19 is a diagram illustrating an example of a process of rendering the target object OBJ1 and a bullet object BO.
Figure 20:
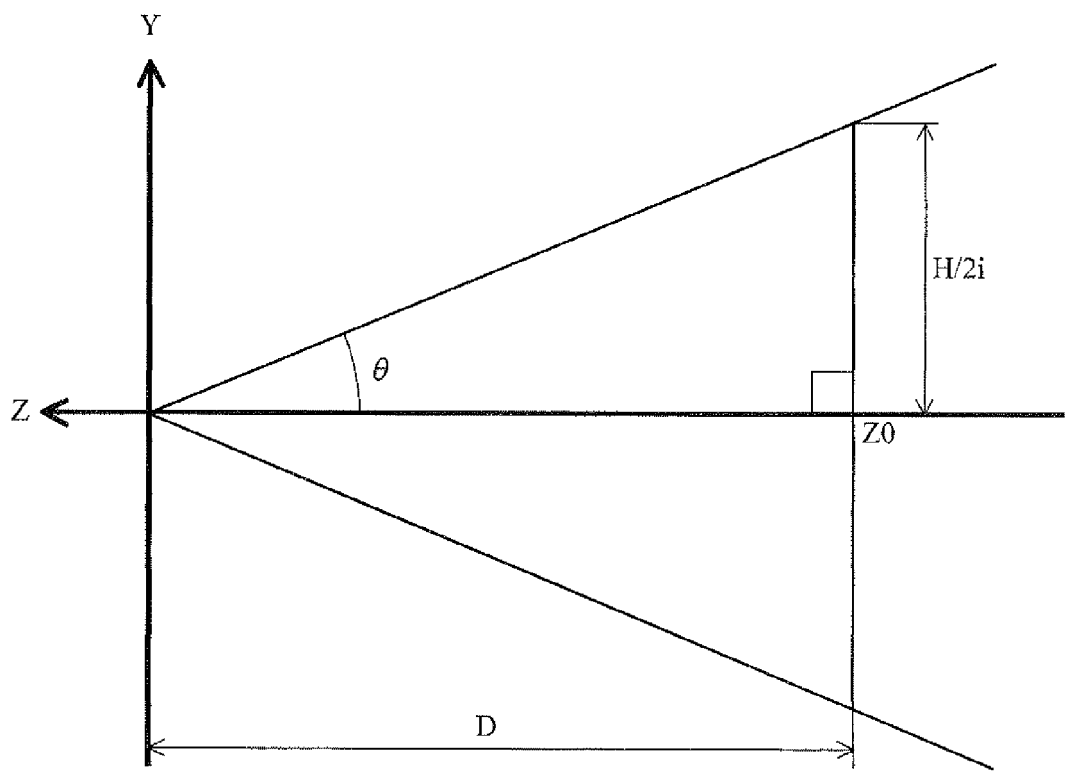
FIG. 20 is a diagram illustrating an example of a coordinate system used to render the target object OBJ and the bullet object BO.

Next, the information processing section 31 newly places the target object in the virtual space (step 78), and ends the process of this subroutine. For example, the information processing section 31 places the target object in the size indicated by the target object size data De2, at the position (Xobj, Yobj, Z0) on which a perspective projection is performed such that the specific-colored region having satisfied the conditions for the appearance overlaps a planar polygon, on the entire main surface of which the texture of the camera image is mapped (see FIGS. 16 and 17), to thereby update the target object data De using the placement position. With reference to FIGS. 19 and 20, a description is given below of an example where the target object OBJ1 is placed in the virtual space.

In the present embodiment, as shown in FIG. 19, an image obtained by rendering the target object OBJ1 with a perspective projection from a virtual camera C2 is generated as a virtual world image. Here, to make representation such that the target object OBJ1 has appeared from the camera image displayed on the upper LCD 22, it is necessary to perform a perspective projection such that the target object OBJ1 overlaps the position of the target object in the specific-colored region in the planar polygon, on the entire main surface of which the texture of the camera image is mapped (see FIGS. 16 and 17).

The case is considered where the target object OBJ1 is subjected to a perspective projection in the direction of (X, Y, Z)=(0, 0, −1) from the origin. In this case, if the target object OBJ1 is placed at the position of Z=Z0 shown in FIG. 20, the size of the target object OBJ1 in the display screen per pixel in the texture corresponds to 1 dot on the display screen. Here, the position of Z=Z0 is the position where, when the angle of view in the Y-axis direction of the virtual camera C2 that performs a perspective projection on the target object OBJ is θ, the length between the fixation point of the virtual camera C2 and the display range in the Y-axis positive direction is H/2$i$. It should be noted that as described above, "H" is the number of vertical dots on the display screen of the upper LCD 22, and "i" is the number of pixels in the texture to be mapped onto 1 unit of the coordinate system of the virtual space. Then, if the distance between the center of the virtual camera C2 and the position of Z=Z0 is D (D>0), the following formula is obtained.

$$\tan \theta = (H/2i)/D = H/2Di$$

Thus, when a virtual world image is generated by performing a perspective projection on the target object OBJ1, the settings of the virtual camera C2 for generating the virtual world image are as follows:

The angle of view θ in the Y-axis direction=$\tan^{-1}$ (H/2D$i$)
The aspect ratio=W:H Then, when the target object OBJ1 having a size of w×h is placed at the view coordinates (X0, Y0, Z0) from the virtual camera C2, the target object OBJ1 having a size of w×h is placed at the position (X0, Y0) on the coordinate system shown in FIG. 17 when displayed. Accordingly, when the target object OBJ1 is placed at the view coordinates (Xobj, Yobj, Z0) having the X-axis coordinate and the Y-axis coordinate of the position (Xobj, Yobj) of the target object set in step 77 described above, a perspective projection is performed such that the target object OBJ1 overlaps the specific-colored region in the planar polygon, on the entire main surface of which the texture of the camera image is mapped. It should be noted that if the placement of the planar polygon, on the entire main surface of which the texture of the camera image is mapped, and the target objects OBJ1 through OBJ3 at substantially the same position in the perspective direction makes the display of the planar polygon and the target objects OBJ1 through OBJ3 unstable, the perspective position of the target object OBJ1 may be set slightly closer (to the virtual camera C2).

Referring back to FIG. 12, after the target object appearance process in step 55 described above, the information processing section 31 performs a process related to the bullet object (step 56), and proceeds to the subsequent step. With reference to FIG. 14, a bullet object process is described below.

Referring to FIG. 14, the information processing section 31 moves the bullet object BO in the virtual space in accordance with a moving velocity vector that is set (step 81), and proceeds to the subsequent step. For example, in accordance with the position and the moving velocity vector of the bullet object BO that are set in the bullet object data Df, the information processing section 31 moves the position of the bullet object BO in the virtual space at the velocity indicated by the moving velocity vector and in the direction indicated by the moving velocity vector. Then, the information processing section 31 updates the bullet object data Df using the moved position of the bullet object BO.

Next, the information processing section 31 determines whether or not the user of the game apparatus 10 has performed a firing operation (step 82). For example, with reference to the controller data Da1, the information processing section 31 determines whether or not the user has performed a predetermined firing operation (e.g., pressed the button 14B (A button)). When the firing operation has been performed, the information processing section 31 proceeds to the subsequent step 83. On the other hand, when the firing operation has not been performed, the information processing section 31 proceeds to the subsequent step 84.

In step 83, in accordance with the firing operation, the information processing section 31 places the bullet object BO at the position of the virtual camera in the virtual space, sets the moving velocity vector of the bullet object BO, and proceeds to the subsequent step 84. For example, the information processing section 31 newly places the bullet object BO at the position of the virtual camera that performs a perspective projection on the target object OBJ, to thereby update the bullet object data Df using the position of the placed bullet object BO. Further, the information processing section 31 sets a vector of a predetermined size in the direction from the position of the virtual camera to the fixation point of the virtual camera, to thereby update the bullet object data Df such that the set vector is the moving velocity vector of the newly placed bullet object BO.

In step 84, the information processing section 31 determines whether or not the target object OBJ and the bullet object BO have made contact with each other in the virtual space. For example, using the position of the target object OBJ indicated by the target object data De and the position of the bullet object BO indicated by the bullet object data Df, the information processing section 31 determines whether or not the target object OBJ and the bullet object BO have made contact with each other in the virtual space. When the target object OBJ and the bullet object BO have made contact with each other, the information processing section 31 proceeds to the subsequent step 85. On the other hand, when the target object OBJ and the bullet object BO have not made contact with each other, the information processing section 31 proceeds to the subsequent step 86.

In step 85, the information processing section 31 performs a point addition process, and proceeds to the subsequent step 86. For example, in the point addition process, the information processing section 31 adds predetermined points to the score of the game indicated by the score data Dg, to thereby update the score data Dg using the score after the addition. It should be noted that the points to be added may be varied depending on the type and the size of the target object OBJ having made contact. Further, in the point addition process, when the conditions for the disappearance have been satisfied, the information processing section 31 performs a process of causing both objects having made contact with each other on the basis of the determination in step 84 described above (i.e., the target object OBJ and the bullet object BO), to disappear from the virtual space (e.g., initializing the target object data De concerning the target object OBJ having made contact with the bullet object BO and the bullet object data Df concerning the bullet object BO having made contact with the target object OBJ, such that the target object OBJ and the bullet object BO are not present in the virtual space).

In step 86, the information processing section 31 determines whether or not the bullet object BO has reached a predetermined position in the virtual space. For example, the information processing section 31 determines whether or not the position of the bullet object BO indicated by the bullet object data Df has reached the position of Z=Z0 described above, as viewed from the virtual camera. When the bullet object BO has reached the predetermined position, the information processing section 31 proceeds to the subsequent step 87. On the other hand, when the bullet object BO has not reached the predetermined position, the information processing section 31 ends the process of this subroutine.

In step 87, the information processing section 31 performs a process of causing the bullet object BO having reached the predetermined position on the basis of the determination in step 86 described above, to disappear from the virtual space, and ends the process of the subroutine. For example, the information processing section 31 performs a process of causing the bullet object BO having reached the predetermined position on the basis of the determination in step 86 described above, to disappear from the virtual space (e.g., initializing the bullet object data Df concerning the bullet object BO such that the bullet object BO is not present in the virtual space).

Referring back to FIG. 12, after the process related to the bullet object in step 56 described above, the information processing section 31 calculates the motion of the game apparatus 10 (step 57), and proceeds to the subsequent step. As an example, the information processing section 31 calculates the motion of the game apparatus 10 (e.g., a change in the capturing direction of the real camera provided in the game apparatus 10) using the angular velocities indicated by the angular velocity data Da2, to thereby update the motion data Di using the calculated motion. Specifically, when the user has changed in real space the capturing direction of the real camera provided in the game apparatus 10, the orientation of the entire game apparatus 10 also changes, and therefore, angular velocities corresponding to the change are generated in the game apparatus 10. Then, the angular velocity sensor 40 may detect the angular velocities generated in the game apparatus 10, whereby data indicating the angular velocities is stored in the angular velocity data Da2. Thus, using the angular velocities indicated by the angular velocity data Da2, the information processing section 31 can calculate the direction and the amount (angle) that have changed in the capturing direction of the real camera provided in the game apparatus 10, as the motion of the game apparatus 10.

Next, in accordance with the motion of the game apparatus 10, the information processing section 31 changes the position and the direction of the virtual camera in the virtual space (step 58), and proceeds to the subsequent step. For example, the information processing section 31 imparts the same changes as those in the capturing direction of the real camera of the game apparatus 10 in real space, to the virtual camera in the virtual space, to thereby update the virtual camera data Di using the position and the direction of the virtual camera after the changes. As an example, if the capturing direction of the real camera of the game apparatus 10 in real space has turned left by A° (a change where the game apparatus 10 has moved such that the x-axis and the z-axis rotate to the left by A° about the y-axis, as viewed in the y-axis negative direction), the direction of the virtual camera in the virtual space also turns left by A° (a change in the direction of the virtual camera such that in the view coordinates from the virtual camera, the X-axis and the Z-axis rotate to the left by A° about the Y-axis, as viewed in the Y-axis negative direction). Consequently, the target object OBJ displayed as if placed in real space is displayed as if placed at the same position in real space even when the direction and the position of the game apparatus 10 have changed in real space.

Next, the information processing section 31 performs a process of rendering the virtual space (step 59), and proceeds to the subsequent step. For example, the information processing section 31 updates the virtual-space rendered image data Dj2 using an image obtained by rendering the virtual space where the target object OBJ and the bullet object BO are placed. For example, as shown in FIG. 19, in the virtual space, the target object OBJ1 and the bullet object BO are placed in accordance with the positions and the directions indicated by the target object data De and the bullet object data Df. Further, in the virtual space, the virtual camera C2 for rendering the virtual space is placed in accordance with the position and the direction indicated by the virtual camera data Di. Here, as described above, the target object OBJ1 is placed at the position where it has appeared from the specific-colored region included in the camera image displayed on the upper LCD 22. Then, a virtual world image is generated by rendering with a perspective projection from the virtual camera C2 the target object OBJ1 and the bullet object BO that are placed in the virtual space, to thereby update the virtual-space rendered image data Dj2.

Next, the information processing section 31 generates a display image obtained by combining the real world image with the virtual world image, displays the display image on the upper LCD 22 (step 60), and proceeds to the subsequent step. For example, the information processing section 31 acquires the real world image indicated by the camera-image rendered image data Dj 1 and the virtual world image indicated by the virtual-space rendered image data Dj2, and generates a display image by superimposing the virtual world image on the real world image such that the virtual world image is given preference, to thereby update the display image data Dk using the display image. Further, the CPU 311 of the information processing section 31 stores the display image indicated by the display image data Dk in the VRAM 313. Then, the GPU 312 of the information processing section 31 may output the display image drawn in the VRAM 313 to the upper LCD 22, whereby the display image is displayed on the upper LCD 22. It should be noted that when a virtual world image is not stored in the virtual-space rendered image data Dj2, the information processing section 31 may use the real world image indicated by the camera-image rendered image data Dj1 as it is as the display image.

Next, the information processing section 31 determines whether or not the game is to be ended (step 61). Conditions for ending the game may be, for example: that particular conditions have been satisfied so that the game is over; or that the user has performed an operation for ending the game. When the game is not to be ended, the information processing section 31 proceeds to step 52 described above, and repeats the same process. On the other hand, when the game is to be ended, the information processing section 31 ends the process of the flow chart.

As described above, in the display control processing according to the above embodiment, when a specific-colored subject having a predetermined size or greater is included in the real world image obtained from the real camera, display is performed such that a target object corresponding to the specific color is caused to appear. This makes it possible to display a new image in which an object appears in accordance with a subject.

It should be noted that in the above descriptions, three colors, namely, "red", "green", and "blue" are the specific colors from which the target objects appear. Alternatively, other colors and other attributes may serve as the specific colors from which the target objects appear. For example, other hues, such as orange, yellow, purple, and pink, may be set as specific colors from which target objects appear. Achromatic colors, such as black, gray, and white, may be set as specific colors from which target objects appear. Alternatively, a color brighter or a color darker than a predetermined threshold (a color having a relatively high brightness or a color having a relatively low brightness), or a color closer to or a color further from a pure color than a predetermined threshold (a color having a relatively high saturation or a color having a relatively low saturation) may be set as a specific color from which a target object appears. It is needless to say that the use of at least one of the items of the color information, namely, the RGB values, the hue, the saturation, and the brightness, enables a target object appearance process similar to the above.

In addition, in the above descriptions, as an example, the camera image is divided into blocks each having a predetermined size, and the presence or absence of a specific color is determined for each block. Alternatively, the presence or absence of a specific color may be determined in another unit. For example, the presence or absence of a specific color may be determined on a pixel-by-pixel basis in the camera image.

In addition, in the above descriptions, as an example, a target object serving as a shooting target appears from a specific-colored region having satisfied the conditions for the appearance. Alternatively, display may be performed such that another object appears from this region. For example, an obstacle object that, when caused to collide with an enemy object moving in the virtual space, defeats the enemy object may be caused to appear from a specific-colored region having satisfied the conditions for the appearance. In this case, it is possible to achieve a game where the obstacle object is caused to appear in order to defeat the enemy object that is moving while displayed on the upper LCD 22. Then, the user who executes this game by operating the game apparatus 10 needs to capture with the real camera of the game apparatus 10 a specific color from which the obstacle object is caused to appear, in order to cause the obstacle object to appear, and also needs to adjust the position of capturing the specific-colored subject with the real camera, in order to cause the obstacle object to appear at the position where the obstacle object collides with the enemy object that is moving in the virtual space. As described above, the obstacle object that defeats the enemy object may be caused to appear from the specific-colored region having satisfied the conditions for the appearance, whereby it is possible to achieve a game that provides an unprecedented new operation feeling. As another example, the specification may be such that when the conditions for the appearance have been satisfied, an object appears so that the user simply views the object displayed on the upper LCD 22.

In addition, in the above descriptions, as an example, the angular velocities generated in the game apparatus 10 are detected, and the motion of the game apparatus 10 in real space is calculated using the detected angular velocities. Alternatively, the motion of the game apparatus 10 may be calculated using another method. As a first example, the motion of the game apparatus 10 may be calculated using the accelerations detected by the acceleration sensor 39 built into the game apparatus 10. As an example, when the computer performs processing on the assumption that the game apparatus 10 having the acceleration sensor 39 is in a static state (i.e., performs processing on the assumption that the acceleration detected by the acceleration sensor 39 is the gravitational acceleration only), if the game apparatus 10 is actually in a static state, it is possible to determine, on the basis of the detected acceleration, whether or not the game apparatus 10 is tilted relative to the direction of gravity, and also possible to determine to what degree the game apparatus 10 is tilted. As another example, when it is assumed that the game apparatus 10 having the acceleration sensor 39 is in a dynamic state, the acceleration sensor 39 detects the acceleration corresponding to the motion of the acceleration sensor 39 in addition to a component of the gravitational acceleration. This makes it possible to determine the motion direction and the like of the game apparatus 10 by removing the component of the gravitational acceleration by a predetermined process. Specifically, when the game apparatus 10 having the acceleration sensor 39 is moved by being dynamically accelerated with the user's hand, it is possible to calculate various motions and/or positions of the game apparatus 10 by processing the acceleration signals generated by the acceleration sensor 39. It should be noted that even when it is assumed that the acceleration sensor 39 is in a dynamic state, it is possible to determine the tilt of the game apparatus 10 relative to the direction of gravity by removing the acceleration corresponding to the motion of the acceleration sensor 39 by a predetermined process.

As a second example, the motion of the game apparatus 10 may be calculated using the amount of movement of a camera image captured in real time by the real camera built into the game apparatus 10 (the outer capturing section 23 or the inner capturing section 24). For example, when the motion of the game apparatus 10 has changed the capturing direction and the capturing position of the real camera, the camera image captured by the real camera also changes. Accordingly, it is possible to calculate the angle of change in the capturing direction of the real camera, the amount of movement of the capturing position, and the like, using changes in the camera image captured by the real camera built into the game apparatus 10. As an example, a predetermined physical body is recognized in a camera image captured by the real camera built into the game apparatus 10, and the capturing angles and the capturing positions of the physical body are chronologically compared to one another. This makes it possible to calculate the angle of change in the capturing direction of the real camera, the amount of movement of the capturing position, and the like, from the amounts of changes in the capturing angle and the capturing position. As another example, the entire camera images captured by the real camera built into the game apparatus 10 are chronologically compared to one another. This makes it possible to calculate the angle of change in the capturing direction of the real camera, the amount of movement of the capturing position, and the like, from the amounts of changes in the capturing direction and the capturing range in the entire image.

As a third example, the motion of the game apparatus 10 may be calculated by combining at least two of: the angular velocities generated in the game apparatus 10; the accelerations generated in the game apparatus 10; and a camera image captured by the game apparatus 10. This makes it possible that in the state where it is difficult to estimate the motion of the game apparatus 10 in order to calculate the motion of the game apparatus 10 from one parameter, the motion may be calculated by combining this parameter with another parameter, whereby the motion of the game apparatus 10 is calculated so as to compensate for such a state. As an example, to calculate the motion of the game apparatus 10 in the second example described above, if the captured camera image has moved chronologically in a horizontal direction, it may be difficult to accurately determine whether the capturing angle of the game apparatus 10 has rotated about the vertical axis, or the game apparatus 10 has moved horizontally. In this case, it is possible to easily determine, using the angular velocities generated in the game apparatus 10, whether the game apparatus 10 has moved so as to rotate or moved horizontally.

In addition, as a fourth example, the motion of the game apparatus 10 may be calculated using so-called AR (augmented reality) technology.

In addition, in the above descriptions, as an example, a planar image (a planar view image, as opposed to the stereoscopically visible image described above) of the real world on the basis of a camera image CI acquired from either one of the outer capturing section 23 and the inner capturing section 24 is displayed on the upper LCD 22. Alternatively, an image stereoscopically visible with the naked eye (a stereoscopic image) may be displayed on the upper LCD 22. For example, as described above, the game apparatus 10 can display on the upper LCD 22 a stereoscopically visible image (stereoscopic image) using camera images acquired from the left outer capturing section 23a and the right outer capturing section 23b. In this case, drawing is performed such that a target object appears from a specific-colored subject included in the stereoscopic image displayed on the upper LCD 22.

For example, to perform drawing such that a target object appears from a specific-colored subject included in the stereoscopic image, the display control processing described above is performed using a left-eye image obtained from the left outer capturing section 23a and a right-eye image obtained from the right outer capturing section 23b. Specifically, in the display control processing shown in FIG. 12, a perspective transformation may be performed from two virtual cameras (a stereo camera), on the target object OBJ and the bullet object BO that are placed in the virtual space, whereby a left-eye virtual world image and a right-eye virtual world image are obtained. Then, a left-eye display image is generated by combining a left-eye real world image (an image obtained by rendering a left-eye image in step 53 described above) with the left-eye virtual world image, and a right-eye display image is generated by combining a right-eye real world image (an image obtained by rendering a right-eye image in step 53 described above) with the right-eye virtual world image. Then, the left-eye display image and the right-eye display image are output to the upper LCD 22.

In addition, in the above descriptions, a real-time moving image captured by the real camera built into the game apparatus 10 is displayed on the upper LCD 22, and display is performed such that a target object appears in the moving image (camera image) captured by the real camera. In the present invention, however, the images to be displayed on the upper LCD 22 have various possible variations. As a first example, a moving image recorded in advance, or a moving image or the like obtained from television broadcast or another device, is displayed on the upper LCD 22. In this case, the moving image is displayed on the upper LCD 22, and when a specific-colored subject is included in the moving image, a target object appears in the moving image. As a second example, a still image obtained from the real camera built into the game apparatus 10 or another real camera is displayed on the upper LCD 22. In this case, the still image obtained from the real camera is displayed on the upper LCD 22, and when a specific-colored subject is included in the still image, a target object appears in the still image. Here, the still image obtained from the real camera may be a still image of the real world captured in real time by the real camera built into the game apparatus 10, or may be a still image of the real world captured in advance by the real camera or another real camera, or may be a still image obtained from television broadcast or another device.

In addition, in the above embodiment, the upper LCD 22 is a parallax barrier type liquid crystal display device, and therefore is capable of switching between stereoscopic display and planar display by controlling the on/off states of the parallax barrier. In another embodiment, for example, the upper LCD 22 may be a lenticular type liquid crystal display device, and therefore may be capable of displaying a stereoscopic image and a planar image. Also in the case of the lenticular type, an image is displayed stereoscopically by dividing two images captured by the outer capturing section 23, each into vertical strips, and alternately arranging the divided vertical strips. Also in the case of the lenticular type, an image can be displayed in a planar manner by causing the user's right and left eyes to view one image captured by the inner capturing section 24. That is, even the lenticular type liquid crystal display device is capable of causing the user's left and right eyes to view the same image by dividing one image into vertical strips, and alternately arranging the divided vertical strips. This makes it possible to display an image, captured by the inner capturing section 24, as a planar image.

In addition, in the above embodiment, as an example of a liquid crystal display section including two screens, the descriptions are given of the case where the lower LCD 12 and the upper LCD 22, physically separated from each other, are placed above and below each other (the case where the two screens correspond to upper and lower screens). The present invention, however, can be achieved also with an apparatus having a single display screen (e.g., only the upper LCD 22), or an apparatus that controls the display of an image to be displayed on a single display device. Alternatively, the structure of a display screen including two screens may be another structure. For example, the lower LCD 12 and the upper LCD 22 may be placed on the left and right of a main surface of the lower housing 11. Alternatively, a higher-than-wide LCD that is the same in width as and twice the height of the lower LCD 12 (i.e., physically one LCD having a display size of two screens in the vertical direction) may be provided on a main surface of the lower housing 11, and two images (e.g., a captured image and an image indicating an operation instruction screen) may be displayed on the upper and lower portions of the main surface (i.e., displayed adjacent to each other without a boundary portion between the upper and lower portions. Yet alternatively, an LCD that is the same in height as and twice the width of the lower LCD 12 may be provided on a main surface of the lower housing 11, and two images may be displayed on the left and right portions of the main surface (i.e., displayed adjacent to each other without a boundary portion between the left and right portions). In other words, two images may be displayed using two divided portions in what is physically a single screen. Further, when two images are displayed using two divided portions in what is physically a single screen, the touch panel 13 may be provided on the entire screen.

In addition, in the above descriptions, the touch panel 13 is integrated with the game apparatus 10. It is needless to say, however, that the present invention can also be achieved with the structure where a game apparatus and a touch panel are separated from each other. Further, the touch panel 13 may be provided on the surface of the upper LCD 22, and the display image displayed on the lower LCD 12 in the above descriptions may be displayed on the upper LCD 22. Furthermore, when the present invention is achieved, the touch panel 13 may not need to be provided.

In addition, in the above embodiment, the descriptions are given using the hand-held game apparatus 10 and a stationary game apparatus. The present invention, however, may be achieved by causing an information processing apparatus, such as a general personal computer, to execute the display control program according to the present invention. Alternatively, in another embodiment, not only a game apparatus but also a given hand-held electronic device may be used, such as a personal digital assistant (PDA), a mobile phone, a personal computer, or a camera. For example, a mobile phone may include two display sections and a real camera on the main surface of a housing.

In addition, in the above descriptions, the display control processing is performed by the game apparatus 10. Alternatively, at least some of the process steps in the display control processing may be performed by another device. For example, when the game apparatus 10 is configured to communicate with another device (e.g., a server or another game apparatus), the process steps in the display control processing may be performed by the cooperation of the game apparatus 10 and said another device. As an example, a case is possible where: another device performs a process of setting a real world image and the target objects OBJ1 through OBJ3; and the game apparatus 10 acquires data concerning the real world image and the target objects OBJ1 through OBJ3, and performs the processes of steps 56 through 61. Thus, when at least some of the process steps in the display control processing is performed by another device, it is possible to perform processing similar to the display control processing described above. Thus, the display control processing described above can be performed by a processor or by the cooperation of a plurality of processors, the processor and the plurality of processors included in an information processing system that includes at least one information processing apparatus. Further, in the above embodiment, the processing of the flow chart described above is performed in accordance with the execution of a predetermined program by the information processing section 31 of the game apparatus 10. Alternatively, some or all of the processing may be performed by a dedicated circuit provided in the game apparatus 10.

It should be noted that the shape of the game apparatus 10, and the shapes, the number, the placement, or the like of the various buttons of the operation button 14, the analog stick 15, and the touch panel 13 that are provided in the game apparatus 10 are merely illustrative, and the present invention can be achieved with other shapes, numbers, placements, and the like. Further, the processing orders, the setting values, the criterion values, and the like that are used in the display control processing described above are also merely illustrative, and it is needless to say that the present invention can be achieved with other orders and values.

It should be noted that the display control program (game program) described above may be supplied to the game apparatus 10 not only from an external storage medium, such as the external memory 45 or the data storage external memory 46, but also via a wireless or wired communication link. Further, the program may be stored in advance in a non-volatile storage device of the game apparatus 10. It should be noted that examples of an information storage medium having stored thereon the program may include a CD-ROM, a DVD, and another given optical disk storage medium similar to these, a flexible disk, a hard disk, a magnetic optical disk, and a magnetic tape, as well as a non-volatile memory. Furthermore, the information storage medium for storing the program may be a volatile memory that temporarily stores the program.

While the invention has been described in detail, the foregoing description is in all aspects illustrative and not restrictive. It is understood that numerous other modifications and variations can be devised without departing from the scope of the invention. It is understood that the scope of the invention should be interpreted only by the appended claims. Further, throughout the specification, it should be understood that terms in singular form include the concept of plurality unless otherwise specified. Thus, it should be understood that articles or adjectives indicating the singular form (e.g., "a", "an", "the", and the like in English) include the concept of plurality unless otherwise specified. It is also understood that one skilled in the art can implement the invention in the equivalent range on the basis of the description of the invention and common technical knowledge, from the description of the specific embodiments of the invention. Furthermore, it should be understood that terms used in the present specification have meanings generally used in the art unless otherwise specified. Therefore, unless otherwise defined, all the jargons and technical terms have the same meanings as those generally understood by one skilled in the art of the invention. In the event of any contradiction, the present specification (including meanings defined herein) has priority.

A storage medium having stored thereon a display control program, a display control apparatus, a display control system, and a display control method, according to the present invention can set and control the display of a new image, using a real world image, and therefore are suitable for use as a display control program, a display control apparatus, a display control system, a display control method, and the like that perform, for example, a process of displaying various images on a display device.

What is claimed is:

1. A non-transitory computer-readable storage medium having stored thereon a display control program to be executed by a computer of a display control apparatus that displays an image on a display device, the display control program causing the computer to perform functionality comprising:

acquiring a captured image captured by a real camera;

detecting at least one pixel having specific range color information in color information including at least one selected from the group including RGB values, a hue, a saturation, and a brightness in the acquired captured image;

generating, on the basis of the specific range color information of the at least one detected pixel, an image of an object to be placed in a virtual world;

generating a combined image obtained by combining the acquired captured image with a virtual world image in which the object placed in the virtual world is viewed from a virtual camera;

generating an image of the virtual world, in which the object is viewed from the virtual camera, as the virtual world image by placing the object in the virtual world such that, in accordance with a detection position where the at least one pixel having the specific range color information has been detected in the captured image, the image of the object in the virtual world image is combined with the captured image so as to overlap the detection position; p1 detecting the motion of the real camera and setting a position and a capturing direction of the virtual camera by imparting the same motion as the motion of the real camera to the virtual camera;

after generating the virtual world image in which the object is placed in the virtual world, generating, as the virtual world image, an image of the virtual world, in which the object is viewed from the virtual camera; and displaying the combined image on the display device.

2. The non-transitory computer-readable storage medium having stored thereon the display control program according to claim 1, wherein the display control program further causing the computer to perform functionality comprising:

detecting a region of the at least one pixel having the specific range color information in the acquired captured image;

calculating an area determined in accordance with the detected region; and generating the image of the object by setting a size of the object in accordance with the calculated area.

3. The non-transitory computer-readable storage medium having stored thereon the display control program according to claim 1, wherein the display control program further causing the computer to perform functionality comprising:

setting in advance a plurality of objects for specific ranges of the color information, respectively, and placing in the virtual world, among the plurality of objects, the object corresponding to the specific range color information of the at least one detected pixel, and thereby generating an image of the placed object.

4. The non-transitory computer-readable storage medium having stored thereon the display control program according to claim 1, the display control program further causing the computer to perform functionality comprising:

acquiring data indicating an operation input provided by a user;

placing, when the acquired data indicates a predetermined operation input, an operation object in the virtual world, the operation object being different from the object; and adding a predetermined point when a predetermined positional relationship has been obtained between the object and the operation object in the virtual world, wherein the image of the object and an image of the operation object is generated by placing also the operation object in the virtual world.

5. The non-transitory computer-readable storage medium having stored thereon the display control program according to claim 4, the display control program further causing the computer to perform functionality comprising:

placing a moving object in the virtual world, aside from the operation object, the moving object moving in accordance with a predetermined algorithm, wherein a predetermined point is further added when a predetermined positional relationship has been obtained between the moving object and the operation object, and the image of the object, the image of the operation object, and an image of the moving object are generated by placing also the moving object in the virtual world.

6. The non-transitory computer-readable storage medium having stored thereon the display control program according to claim 1, wherein when the detected at least one pixel having the specific range color information covers a predetermined region or more, an object corresponding to the specific range color information is placed in the virtual world, and an image of the placed object is thereby generated.

7. The non-transitory computer-readable storage medium having stored thereon the display control program according to claim 1, wherein at least one pixel having items of the color information indicating the saturation and the brightness that are equal to or greater than predetermined thresholds, respectively, and also having an item of the color information indicating the hue indicative of a value within a predetermined range is detected.

8. The non-transitory computer-readable storage medium having stored thereon the display control program according to claim 1, wherein the display control program further causing the computer to perform functionality comprising:

dividing the captured image into blocks each including a plurality of pixels;

calculating values indicating hues of the respective blocks on the basis of RGB values of each pixel included in the blocks;

setting, on the basis of predetermined hue ranges including the values indicating the hues of the blocks, hue categories to which the blocks belong, respectively; and selecting, in accordance with a size of a group of adjacent blocks belonging to the same hue category, a group of blocks from which the image of the object is to be generated, and in accordance with the hue category of the selected group of blocks an object is selected to be placed in the virtual world.

9. The non-transitory computer-readable storage medium having stored thereon the display control program according to claim 1, wherein the display control program further causing the computer to perform functionality comprising:

repeatedly acquiring captured images of a real world captured in real time by a real camera available to the display control apparatus, detecting the at least one pixel having the specific range color information in each of the captured images repeatedly acquired, repeatedly generating the combined image by combining each of the captured images repeatedly acquired with the virtual world image generated on the basis of the captured image, and repeatedly displaying on the display device the combined images obtained by combining the captured images repeatedly acquired with the respective virtual world images.

10. A display control apparatus that displays an image on a display device, the display control apparatus comprising at least one processor, the apparatus configured to:

acquire a captured image captured by a real camera;

detect at least one pixel having specific range color information in color information including at least one selected from the group including RGB values, a hue, a saturation, and a brightness in the acquired captured image;

generate an image of an object to be placed in a virtual world on the basis of the specific range color information of the detected at least one pixel;

generate a combined image obtained by combining the acquired captured image with a virtual world image in which the object placed in the virtual world is viewed from a virtual camera;

generate an image of the virtual world, in which the object is viewed from the virtual camera, as the virtual world image by placing the object in the virtual world such that, in accordance with a detection position where the at least one pixel having the specific range color information has been detected in the captured image, the image of the object in the virtual world image is combined with the captured image so as to overlap the detection position;

detect the motion of the real camera and set a position and a capturing direction of the virtual camera by imparting the same motion as the motion of the real camera to the virtual camera;

after generating the virtual world image in which the object is placed in the virtual world, generate, as the virtual world image, an image of the virtual world, in which the object is viewed from the virtual camera; and display the combined image on the display device.

11. A display control system, including a plurality of apparatuses configured to communicate with each other, that displays an image on a display device, the display control system comprising:

a processing system including at least one processor, the processing system configured to:

acquire a captured image captured by a real camera, detect at least one pixel having specific range color information in color information including at least one selected from the group including RGB values, a hue, a saturation, and a brightness in the acquired captured image, generate an image of an object to be placed in a virtual world on the basis of the specific range color information of the detected at least one pixel, generate a combined image obtained by combining the acquired captured image with a virtual world image in which the object placed in the virtual world is viewed from a virtual camera, generate an image of the virtual world, in which the object is viewed from the virtual camera, as the virtual world image by placing the object in the virtual world such that, in accordance with a detection position where the at least one pixel having the specific range color information has been detected in the captured image, the image of the object in the virtual world image is combined with the captured image so as to overlap the detection position, detect the motion of the real camera and set a position and a capturing direction of the virtual camera by imparting the same motion as the motion of the real camera to the virtual camera;

after generating the virtual world image in which the object is placed in the virtual world, generate, as the virtual world image, an image of the virtual world, in which the object is viewed from the virtual camera; and display the combined image on the display device.

12. A display control method performed by a processor or a cooperation of a plurality of processors included in a display control system including at least one information processing apparatus capable of performing display control processing for displaying an image on a display device, the display control method comprising:

acquiring a captured image captured by a real camera;

detecting at least one pixel having specific range color information in color information including at least one selected from the group including RGB values, a hue, a saturation, and a brightness in the acquired captured image;

generating an image of an object to be placed in a virtual world on the basis of the specific range color information of the detected at least one pixel;

generating a combined image obtained by combining the acquired captured image with a virtual world image in which the object placed in the virtual world is viewed from a virtual camera;

generating an image of the virtual world, in which the object is viewed from the virtual camera, as the virtual world image by placing the object in the virtual world such that, in accordance with a detection position where the at least one pixel having the specific range color information has been detected in the captured image, the image of the object in the virtual world image is combined with the captured image so as to overlap the detection position;

detecting the motion of the real camera and setting a position and a capturing direction of the virtual camera by imparting the same motion as the motion of the real camera to the virtual camera;

after generating the virtual world image in which the object is placed in the virtual world, generating, as the virtual world image, an image of the virtual world, in which the object is viewed from the virtual camera; and displaying the combined image on the display device.

* * * * *